United States Patent
Iwai et al.

(10) Patent No.: US 10,621,373 B2
(45) Date of Patent: Apr. 14, 2020

(54) DATA SECURITY MANAGEMENT BASED ON DEVICE LOCATIONS AND CONNECTION STATES

(71) Applicant: Toshiba Memory Corporation, Tokyo (JP)

(72) Inventors: Makoto Iwai, Kanagawa (JP); Teruji Yamakawa, Tokyo (JP); Isao Sakai, Kanagawa (JP); Koki Kanda, Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 398 days.

(21) Appl. No.: 15/438,686

(22) Filed: Feb. 21, 2017

(65) Prior Publication Data

US 2017/0262647 A1 Sep. 14, 2017

(30) Foreign Application Priority Data

Mar. 10, 2016 (JP) .................. 2016-046710

(51) Int. Cl.
*G06F 21/62* (2013.01)
*G06F 21/79* (2013.01)
(Continued)

(52) U.S. Cl.
CPC .......... *G06F 21/6218* (2013.01); *G06F 21/79* (2013.01); *H04W 12/0027* (2019.01);
(Continued)

(58) Field of Classification Search
None
See application file for complete search history.

(56) References Cited

U.S. PATENT DOCUMENTS 7,046,574 B2 5/2006 Furukawa
7,953,368 B2 5/2011 Miwa et al.
(Continued)

FOREIGN PATENT DOCUMENTS

JP 2001306408 A 11/2001
JP 2006178910 A 7/2006
(Continued)

OTHER PUBLICATIONS

Notification of Reasons for Refusal dated Nov. 13, 2018 in corresponding Japanese Patent Application No. 2016-046710 with English translation, 8 pages.

*Primary Examiner* — William J. Goodchild
(74) *Attorney, Agent, or Firm* — Kim & Stewart LLP

(57) ABSTRACT

A mobile storage device includes first and second memory regions in one or more semiconductor memory devices, a positioning system configured to generate positional information indicating a position of the mobile storage device, and a controller. The controller is configured to allow access to the first memory region and prohibit access to the second memory region when the positional information indicates that the position of the mobile storage device is within a first area, and prohibit access to the first memory region and allow access to the second memory region when the positional information indicates that the position of the memory storage device is within a second area, which is different from and does not overlap with the first area.

8 Claims, 34 Drawing Sheets

(51) Int. Cl.
*H04W 12/08* (2009.01)
*H04W 12/00* (2009.01)

(52) U.S. Cl.
CPC ..... *H04W 12/08* (2013.01); *G06F 2221/2111* (2013.01); *G06F 2221/2143* (2013.01); *H04W 12/00503* (2019.01)

(56) References Cited

U.S. PATENT DOCUMENTS

| | | |
|---|---|---|
| 8,594,564 B2 | 11/2013 | Kurata et al. |
| 2003/0169881 A1* | 9/2003 | Niedermeyer ......... G06Q 20/04 380/258 |
| 2003/0182194 A1* | 9/2003 | Choey ................... G06Q 20/04 705/16 |
| 2009/0106319 A1 | 4/2009 | Ogura et al. |
| 2009/0249014 A1* | 10/2009 | Obereiner ........... G06F 12/1441 711/164 |
| 2013/0014268 A1 | 1/2013 | Akita et al. |
| 2014/0067569 A1 | 3/2014 | Katabira |
| 2014/0156952 A1* | 6/2014 | Takeda ................... G06F 21/51 711/147 |

FOREIGN PATENT DOCUMENTS

| | | |
|---|---|---|
| JP | 2007148792 A | 6/2007 |
| JP | 2007323282 A | 12/2007 |
| JP | 2008-011218 A | 1/2008 |
| JP | 2008090431 A | 4/2008 |
| JP | 2009-087241 A | 4/2009 |
| JP | 2009105897 A | 5/2009 |
| JP | 2012-109882 A | 6/2012 |
| JP | 2013020356 A | 1/2013 |
| JP | 2014048977 A | 3/2014 |
| JP | 2014109882 A | 6/2014 |

\* cited by examiner

| PIN No. | SIGNAL |
|---|---|
| PIN 1 | CARD DETECTION/DATA 3(DAT3) |
| PIN 2 | COMMAND(CMD) |
| PIN 3 | Vss |
| PIN 4 | Vdd |
| PIN 5 | CLOCK(CLK) |
| PIN 6 | Vss |
| PIN 7 | DATA 0(DAT0) |
| PIN 8 | DATA 1(DAT1) |
| PIN 9 | DATA 2(DAT2) |

DATA SECURITY MANAGEMENT BASED ON DEVICE LOCATIONS AND CONNECTION STATES

CROSS-REFERENCE TO RELATED APPLICATION

This application is based upon and claims the benefit of priority from Japanese Patent Application No. 2016-046710, filed Mar. 10, 2016, the entire contents of which are incorporated herein by reference.

FIELD

Embodiments described herein relate generally to a mobile storage device and a memory card having a wireless communication function.

BACKGROUND

A mobile information terminal that has various functions can be employed in an environment according to BYOD (Bring your own device).

DETAILED DESCRIPTION

Figure 1:
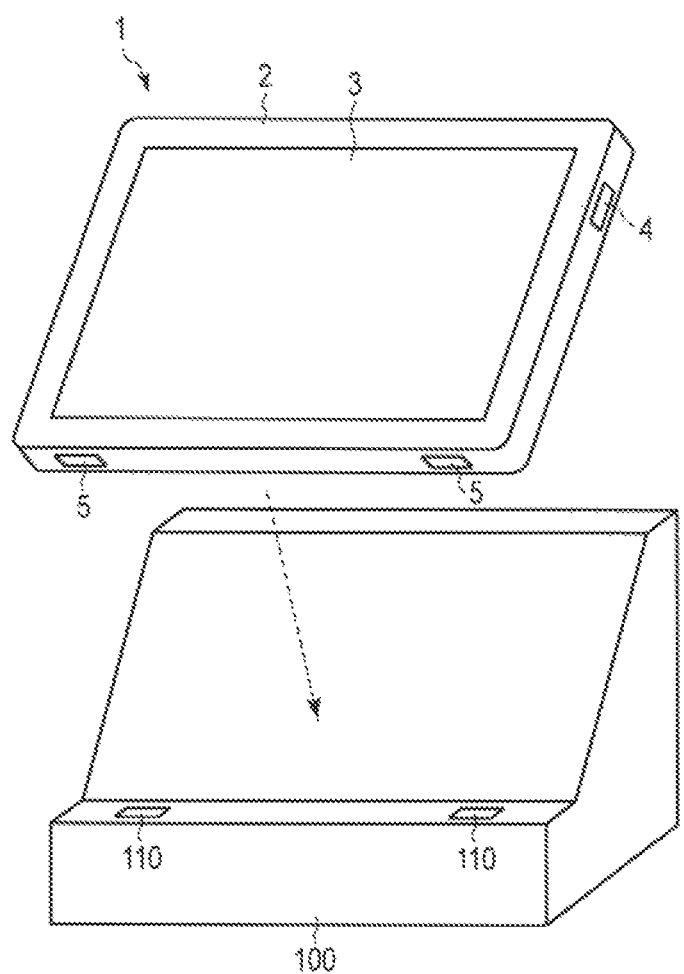
FIG. 1 is an overview of a POS system according to a first embodiment.

An embodiment provides a memory system with improved data security.

In general, according to an embodiment, a mobile storage device includes first and second memory regions in one or more semiconductor memory devices, a positioning system configured to generate positional information indicating a position of the mobile storage device, and a controller. The controller is configured to allow access to the first memory region and prohibit access to the second memory region when the positional information indicates that the position of the mobile storage device is within a first area, and prohibit access to the first memory region and allow access to the second memory region when the positional information indicates that the position of the memory storage device is within a second area, which is different from and does not overlap with the first area.

Embodiments will be described below with reference to the accompanying drawings. The same reference numeral is assigned to elements having the same function and configuration in the following description.

1. First Embodiment

A memory system according to a first embodiment will be described.

1.1 Configuration of POS System

FIG. 1 is an outline view of a POS system including a memory system according to the first embodiment. As illustrated in FIG. 1, the POS system according to the present embodiment includes a POS terminal 1 and a cradle 100.

The POS terminal 1 is a mobile information terminal which functions as a POS register by being mounted onto the cradle 100. In the POS terminal 1 according to the present embodiment, a touch-panel-type liquid crystal display 3 is provided on one side of a plate-like casing 2. The POS terminal 1 is a handheld device that a user can operate by holding the terminal 1 with user's hands and numerous operations can be executed on the liquid crystal display 3 by a touch panel. In addition, a power button 4 is provided on a side surface of the POS terminal 1, and charging electrodes 5 are provided on a bottom of the POS terminal 1.

The cradle 100 is, for example, a stand-type extension device which is attachable to the POS terminal 1, and the POS terminal 1 can be detachably mounted onto the cradle 100. The cradle 100 includes charging electrodes 110, and when the POS terminal 1 is mounted onto the cradle 100, the electrodes 5 come in contact with the electrodes 110, whereby the POS terminal 1 is charged.

Figure 2:
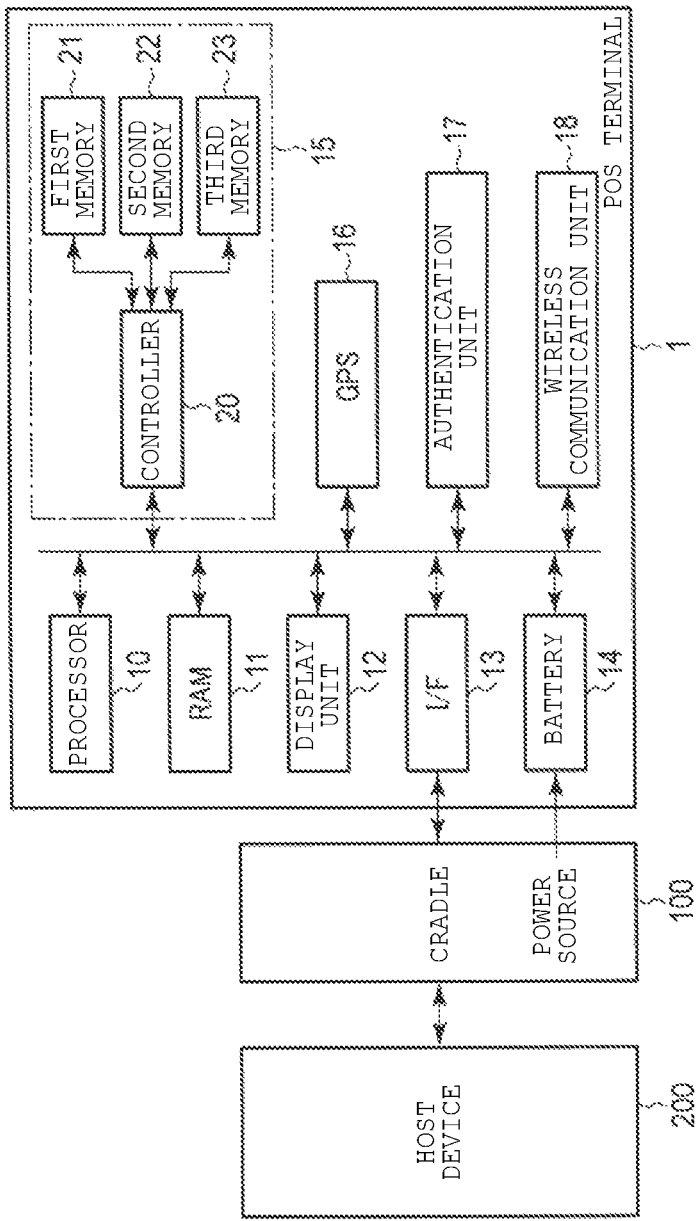
FIG. 2 is a block diagram of a POS terminal according to the first embodiment.

FIG. 2 illustrates an example of a functional block configuration of the POS terminal 1 illustrated in FIG. 1. As illustrated in FIG. 2, the POS terminal 1 includes a processor (for example, a CPU) 10, a built-in memory (RAM) 11, a display unit 12, an interface 13, battery 14, a memory system 15, a GPS (Global positioning system) 16, an authentication unit 17, and a wireless communication unit 18. These blocks are connected to each other to be capable of transmitting and receiving signals to/from each other via a bus.

The processor 10 controls an overall operation of the POS terminal 1. That is, other functional elements are operated in accordance with commands from the processor 10.

The built-in memory 11 is, for example, a volatile semiconductor memory such as a DRAM, and functions as a work area of the processor 10. That is, necessary programs or data are read in the built-in memory 11 and the processor 10 executes the programs on the built-in memory 11, and thus the POS terminal 1 operates.

The display unit 12 corresponds to the liquid crystal display 3 illustrated in FIG. 1, and displays information according to the commands from the processor 10. The display unit 12 has a function of the touch panel described above. The display unit 12 not only displays information but also functions as an interface for receiving a request from a user by a touch of the liquid crystal display 3. The display unit 12 transmits the received request to the processor 10.

The interface 13 transmits and receives signals to/from the cradle 100. For example, the interface 13 transmits the command issued by the processor 10 via the electrodes 5 and 110 illustrated in FIG. 1 or the data stored in the built-in memory 11 or the memory system 15 to a host device 200 via the cradle 100. In addition, the interface 13 receives the data or the command transmitted from the host device 200 via the cradle 100.

The battery 14 functions as a power source of the POS terminal 1 when the POS terminal 1 is operated independently of the cradle 100. When the POS terminal 1 is mounted onto the cradle 100, a voltage is applied to the cradle 100 via the electrodes 5 and 110, and thus the battery 14 is charged.

The memory system 15 stores the programs or the data required for the POS terminal 1 to function as a POS terminal in a nonvolatile manner. The memory system 15 includes a controller 20 and three memories (first to third memories) 21 to 23, for example. The first to third memories 21 to 23 may be physically different memories from each other, or may be regions to be treated being discriminated as memory spaces although being physically similar to each other. For example, the first to third memories 21 to 23 are nonvolatile semiconductor memories (for example, NAND-type flash memories). Details will be described below, but the POS terminal 1 can be used for POS register, order receipt, and stocktaking, for example. Several types of information necessary for these uses are stored in the memories 21 to 23, respectively. The memories 21 to 23 are accessed via the controller 20. That is, the controller 20 accesses the memories 21 to 23 (reads, writes, and erases the data) in response to the command issued from the processor 10. The data read from the memories 21 to 23 is stored in the built-in memory 11, for example.

The GPS 16 obtains position information of the POS terminal 1 by radio waves, and transmits the information to the processor 10 or the memory system 15.

The authentication unit 17 determines whether the host device 200 is an authorized device which enables an access to the POS terminal 1. The determination can be performed using various authentication processing systems. An authentication result is transmitted to the processor 10 or the memory system 15.

The wireless communication unit 18 transmits and receives signals through wireless communication with the host device 200, for example, when the POS terminal 1 is operated independently of the cradle 100.

1.2 Access Conditions to Memory System 15

Figure 3:
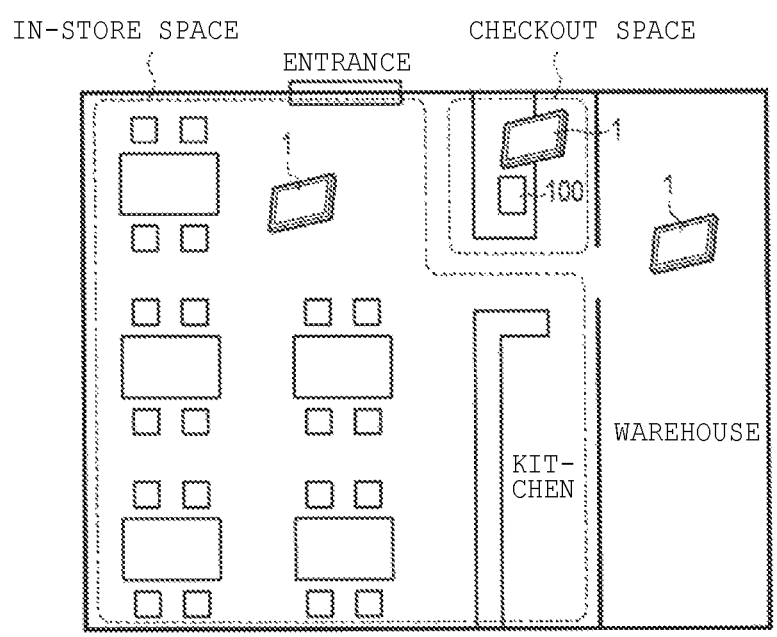
FIG. 3 is an in-store layout in which the POS terminal according to the first embodiment is adopted.

Next, access conditions to the memories 21 to 23 in the memory system 15 will be described. FIG. 3 illustrates an example of use of the POS terminal 1 according to the present embodiment and an in-store layout of the POS terminal 1 used in a restaurant. As illustrated in FIG. 3, the store includes roughly three spaces of a checkout space, an in-store space, and a warehouse.

The checkout space is an area where a checkout operation is made. The cradle 100 is provided on a counter of the checkout space. When the POS terminal 1 is mounted onto the cradle 100, the POS terminal 1 functions as a POS register.

The in-store space is an area where customers order foods and eat and drink. Accordingly, multiple tables and chair sets are arranged in the store space. In the store space, the POS terminal 1 operates independently of the cradle 100, and functions as a handy terminal for receiving orders from customers.

The warehouse is an area where food products necessary for cooking and various dishes are stored. In the warehouse, the POS terminal 1 operates independently of the cradle 100, and functions as a handy terminal for inventory management.

Figure 4:
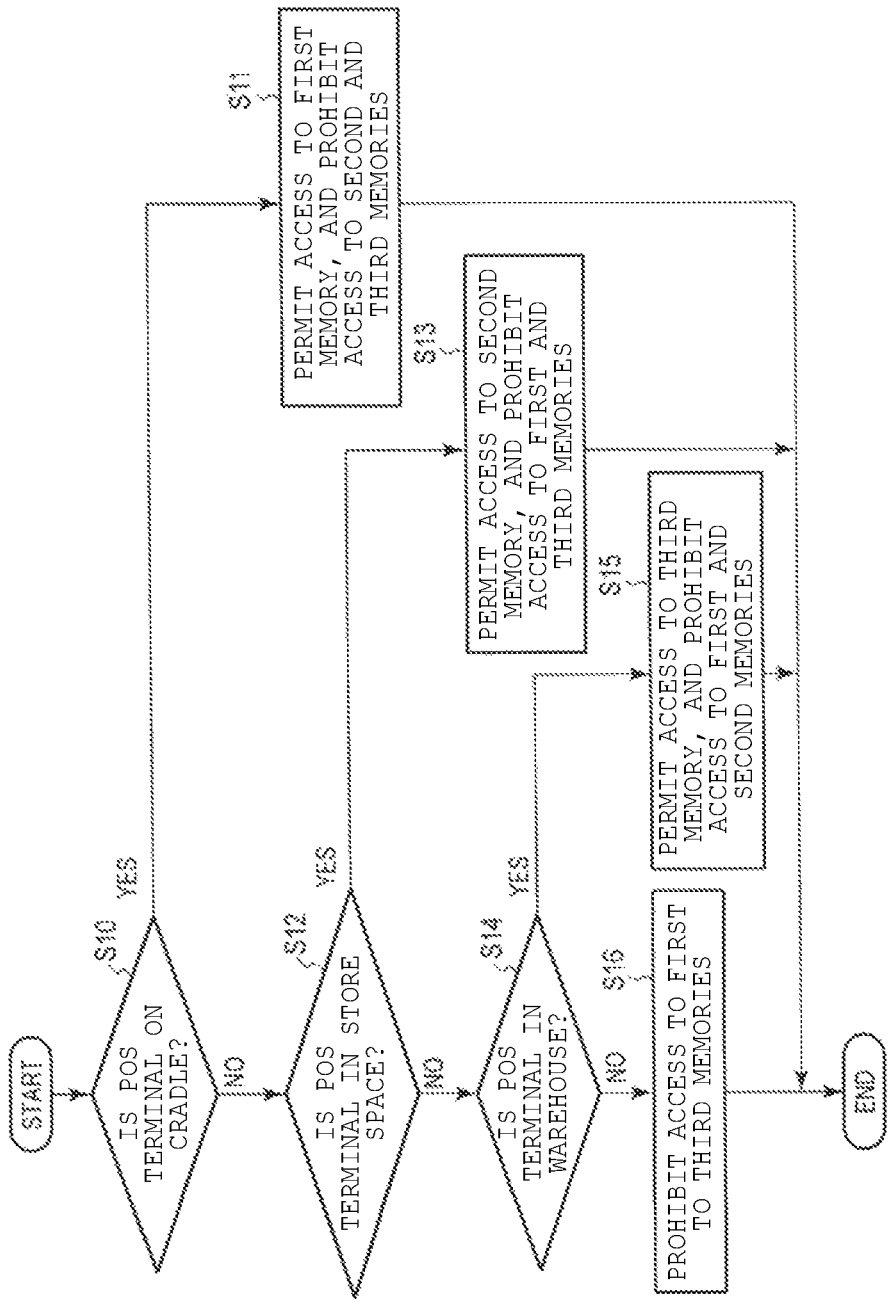
FIG. 4 is a flowchart illustrating an operation of the POS terminal according to the first embodiment.

FIG. 4 is a flowchart illustrating an operation of the POS terminal 1 when an access request is made from the user to the memory system 15.

As illustrated in FIG. 4, when the POS terminal 1 is located on the cradle 100 (step S10, YES), the access to the first memory 21 is permitted, but the access to the second memory 22 and the third memory 23 is prohibited (step S11). Whether the POS terminal 1 is located on the cradle 100 can be determined based on, for example, a signal indicating whether the POS terminal 1 is supplied with the power source from the cradle 100, a signal indicating that the electrodes are connected with the electrodes 110, or position information obtained by the GPS 16. The fact that the POS terminal 1 is located on the cradle 100 means that the POS terminal 1 is located in the checkout space. Therefore, the processor 10 or the controller 20 permits the access to the first memory 21, which stores the program and data for the POS register, in order to cause the POS terminal 1 to function as a POS register. On the other hand, the processor 10 or the controller 20 prohibits the access to the second memory 22 and the third memory 23, and thus disables functions of the order receipt and the stocktaking. That is, when the access to the second memory 22 or the third memory 23 is requested from the user, the processor 10 or the controller 20 rejects the request.

When the POS terminal 1 is not on the cradle 100 but in the store space (step S12, YES), the access to the second memory 22 is permitted, but the access to the first memory 21 and the third memory 23 is prohibited (step S13). Whether or not the POS terminal 1 is located in the store space is determined based on position information obtained from the GPS 16. Then, the processor 10 or the controller 20 permits the access to the second memory 22, and thus allows the POS terminal 1 to function as a handy terminal for order receipt. On the other hand, the processor 10 or the controller 20 prohibits the access to the first memory 21 and the third memory 23, and thus the functions of the POS register and the stocktaking are invalidated.

When the POS terminal 1 is not on the cradle 100 but in the warehouse (step S14, YES), the access to the third memory 23 is permitted, and the access to the first memory 21 and the second memory 22 is prohibited (step S15). Whether the POS terminal 1 is located in the warehouse is determined based on the position information obtained from the GPS 16. Then, the processor 10 or the controller 20 permits the access to the third memory 23, and thus allows the POS terminal 1 to function as a handy terminal for stocktaking. On the other hand, the processor 10 or the controller 20 prohibits the access to the first memory 21 and the second memory 22, and thus the functions of the POS register and the order receipt are invalidated.

When the POS terminal 1 is located neither on the cradle 100 nor in the store space and the warehouse (step S14, NO), the access to all of the first to third memories 21 to 23 are prohibited (step S16).

Figure 5:
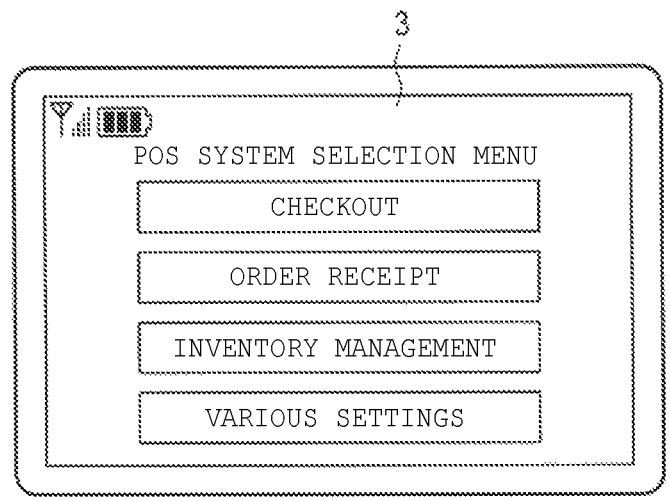
FIG. 5 schematically illustrates a screen displayed on a liquid crystal display of the POS terminal according to the first embodiment.
Figure 6:
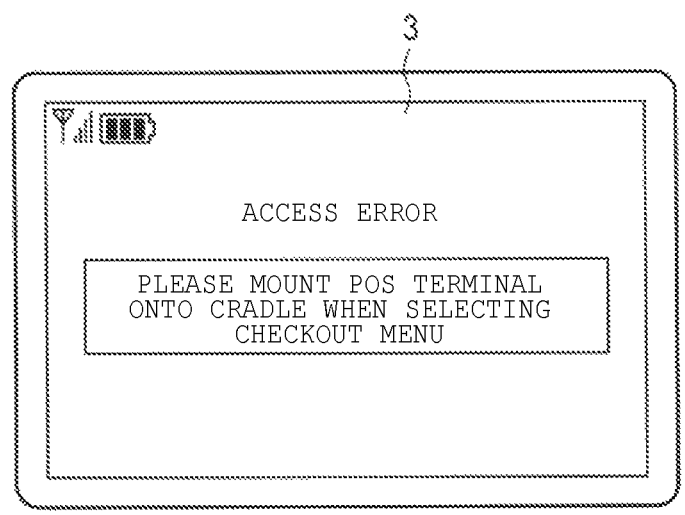
FIG. 6 schematically illustrates another screen displayed on the liquid crystal display of the POS terminal according to the first embodiment.

FIG. 5 illustrates a state of the liquid crystal display 3 immediately after a power source is supplied to the POS terminal 1, for example. As illustrated in FIG. 5, a screen is displayed on the liquid crystal display 3 such that the user can select the checkout function, the order receipt function, the inventory management function, and various setting functions, by processing of the processor 10. FIG. 6 illustrates a screen displayed at the time of selection of the "checkout" function on the screen of FIG. 5 when the POS terminal 1 is used independently of the cradle 100. In this case, the access to the first memory 21 is prohibited, and the checkout function is invalidated. Then, for example, the processor 10 receives, from the controller 20, information indicating that the access to the first memory 21 is failed. Based on this information, the processor 10 displays a message on the liquid crystal display 3 to indicate that the access to the checkout function is failed and the POS terminal 1 is required to be set in the cradle 100 to use the checkout function.

1.3 Advantage of First Embodiment

According to the present embodiment, the POS terminal has improved operation reliability. This advantage will be described below.

Recently, a mobile information terminal such as a tablet terminal is widely used as a POS terminal. Unlike an existing register which is fixedly located, the POS terminal includes multiple functions of an order receipt function, an inventory management function, or the like in addition to the register function. That is, one terminal can perform multiple functions. However, as the function of the POS terminal increases, there is a concern that the user erroneously uses the POS terminal or operates the POS terminal without authorization and with malicious intent.

To deal with this issue, in the present embodiment, the functions of the POS terminal are restricted in accordance with a position thereof. More specifically, in accordance with the position of the POS terminal, a memory region accessible by the user changes. Thus, it is possible to prevent unauthorized use while permitting use of appropriate functions at appropriate places. For example, the checkout function is basically used in the checkout space. For example, when the checkout function is used in the warehouse, there is high probability of the unauthorized use. Accordingly, the checkout function is permitted to be used in the checkout space, and is prohibited to be used in the warehouse or the in-store space. Similarly, this is also applied to other order receipt function and inventory management function.

In FIG. 4, when the POS terminal 1 is located neither on the cradle 100 nor in the store space and the warehouse, the access to all of the first to third memories 21 to 23 is prohibited. In this case, for example, there is a possibility that the POS terminal 1 is taken out of the store without authorization. For that reason, the POS terminal 1 prohibits the access to the memories 21 to 23 so as to prevent information leakage.

As described above, the operation reliability of the terminal can be improved by restriction of the access to the memory based on the position information. In the present embodiment, the POS terminal 1 has three functions of the register function, the order receipt function, and the stocktaking function as an example. Naturally, the POS terminal 1 may have various functions other than the three functions. In addition, the access to one memory is permitted at one place, but the access to the plurality of memories is permitted so that multiple functions may be executed. Further, under specific conditions (for example, when the user is logging in to the POS terminal 1 with administrator authority), the controller 20 may permit the access to all memories 21 to 23 regardless of places. A fourth memory may be further provided to store programs or data common to the respective functions of the POS terminal 1, and the fourth memory may be accessible at all times regardless of the position information. Furthermore, the POS terminal 1 may be not only a tablet-type terminal but also a smartphone, and any other mobile information terminals may be used. This also applies to a second embodiment and subsequent embodiments to be described below.

In addition, specific methods of restricting the access to the memories 21 to 23 are variously selectable, and any other methods may be used. For example, the access may be restricted by the processor 10 or the controller 20 as a main component. When the controller 20 is the main component, the processor 10 having received a memory access from the user, issues an access request to the controller 20. Then, the controller 20 rejects the received access request in response to the position information of the POS terminal 1. The position information may be directly given to the controller 20 from the GPS 16 or may be given from the processor 10.

Conversely, when the processor 10 is the main component, the processor 10 having received the memory access from the user determines, from the requested memory access and the position information, whether or not the access is authorized. When determining that the access is unauthorized, the processor 10 does not issue the access request to the controller 20.

As described above, any other methods of restricting the access may be used, and may also be employed in a second embodiment and subsequent embodiments to be described below.

2. Second Embodiment

A memory system according to a second embodiment will be described below. In this embodiment as a specific example, the controller 20 controls the first to third memories 21 to 23 in the first embodiment. In the following, differences from the first embodiment will be described.

2.1 First Example

First, a first example will be described. The first example corresponds to a case where the first to third memories are independent semiconductor chips, respectively.

2.1.1 Configuration of Memory System 15

Figure 7:
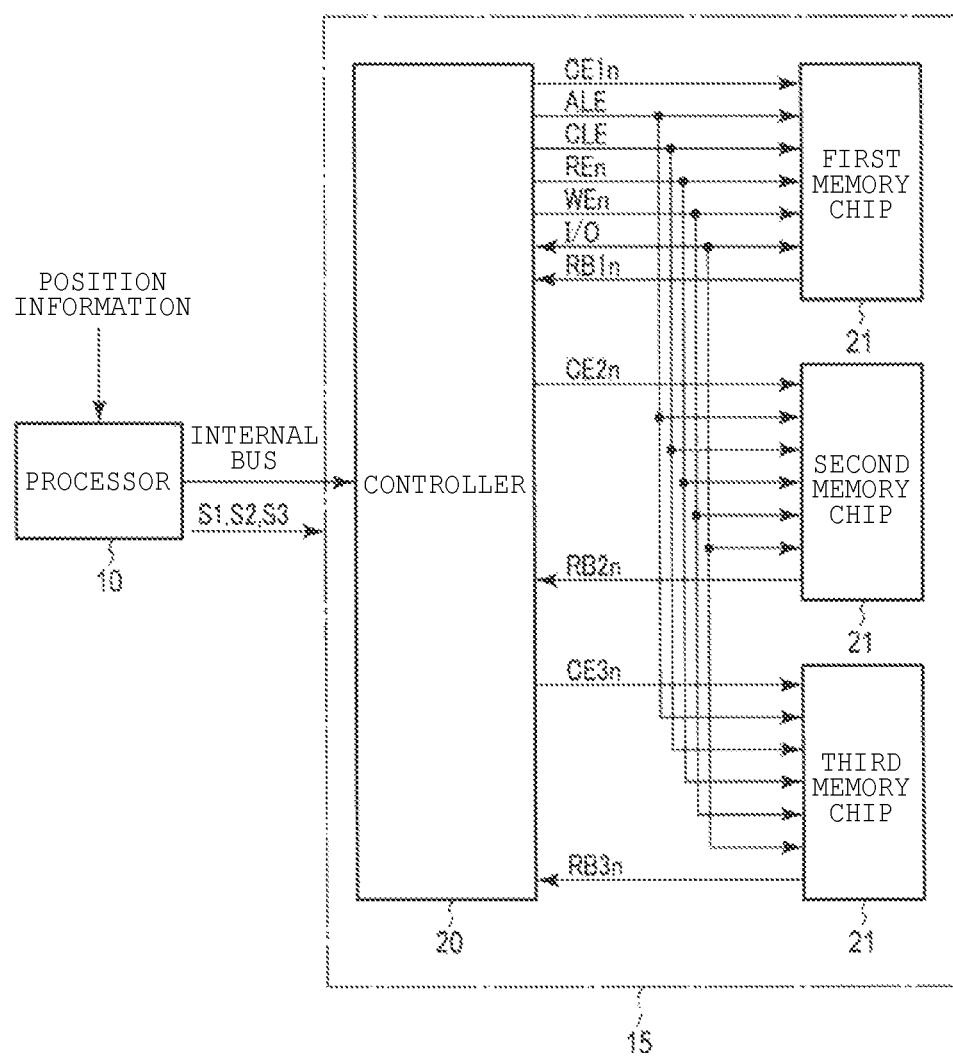
FIG. 7 is a block diagram of a memory system according to a second embodiment.

FIG. 7 is a block diagram of the memory system 15 according to the first embodiment. As illustrated in FIG. 7, the memory system 15 includes three memory chips 21 to 23 independently of the controller 20.

The controller 20 is connected to the memory chips 21 to 23 through an NAND bus, for example. The NAND bus transmits and receives signals according to an NAND interface. Specific examples of these signals include a chip enable signal CEn, an address latch enable signal ALE, a command latch enable signal CLE, a write enable signal WEn, a read enable signal REn, a ready/busy signal RBn, and an input/output signal I/O. In FIG. 7, the signals ALE, CLE, REn, WEn, and I/O are shared by the memory chips 21 to 23, and signals CEns (CE1$n$ to CE3$n$) and RBns (RB1$n$ to RE3$n$) are prepared for each of the memory chips 21 to 23.

The signals CE1$n$ to CE3$n$ are asserted at a logic low level. When the signals CE1$n$ to CE3$n$ are asserted, the memory chips 21 to 23 are activated (enabled), and the access to the memory chips 21 to 23 becomes possible. The signals CLE and ALE are signals that notify the memory chips 21 to 23 of the fact that the input signals I/O to the memory chips 21 to 23 are a command and an address, respectively. The signal WEn is asserted at a low level and is a signal used to input an input signal I/O into the memory chips 21 to 23. The signal REn is also asserted at a low level and used to read the output signal I/O from the memory chips 21 to 23. The ready/busy signals RB1$n$ to RE3$n$ are signals indicating whether the memory chips 21 to 23 are in a ready state (a state in which the command can be received from the controller 20) or in a busy state (a state in which the command can hardly be received from the controller 20), wherein a logic low level indicates the busy state. The input/output signal I/O is an 8-bit signal, for example. The input/output signal I/O is an entity of data transmitted and received between the memory chips 21 to 23 and the controller 20, and includes a command, an address, write data, read data, and status information of the memory chips 21 to 23.

The processor 10 receives position information from the GPS 16 or the electrode 5. Then, the processor 10 issues signals S1 to S3 based on the position information, and transmits these signals to the controller 20. The controller 20 causes the memory chips 21 to 23 to be selectively enabled, based on the received signals S1 to S3.

2.1.2 Operation of the Memory System 15

Figure 8:
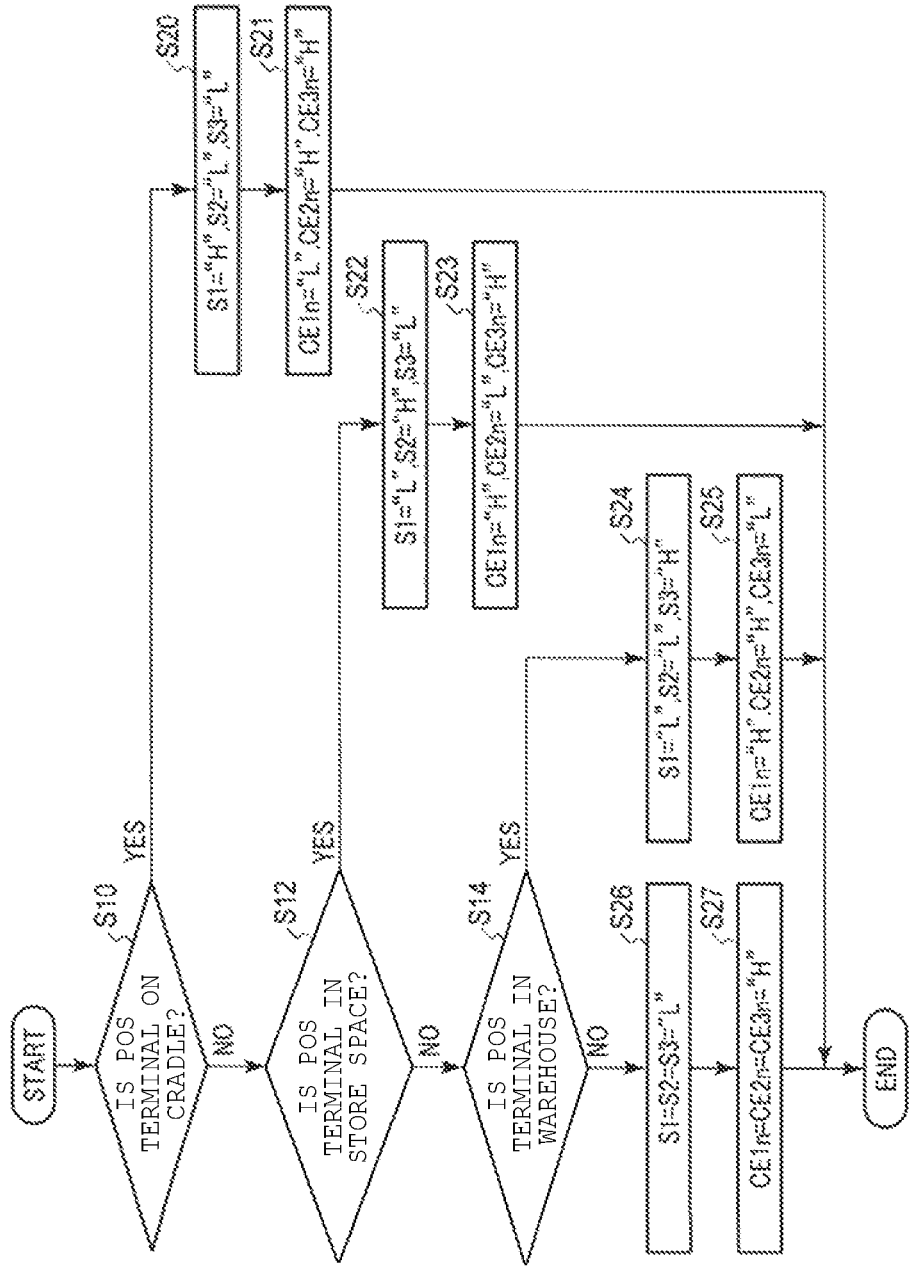
FIG. 8 is a flowchart illustrating an operation of a POS terminal according to the second embodiment.

Next, an operation of the memory system 15 according to the present example will be described. FIG. 8 is a flowchart illustrating states of the signals S1 to S3 and the chip enable signals CE1$n$ to CE3$n$ when the processor 10 access the memory system 15.

As illustrated in FIG. 8, when the POS terminal 1 is located on the cradle 100 (step S10, YES), the processor 10 sets the signal S1 to a logic high level (assert), and sets the signals S2 and S3 to a logic low level (negate) (step S20). Then, the controller 20 sets the signal CE1$n$ to a low level, and sets the signals CE2$n$ and CE3$n$ to a high level (step S21). As a result, the memory chip 21 is enabled, and the memory chips 22 and 23 are disabled.

When the POS terminal 1 is located in the store space (step S12, YES), the processor 10 sets the signal S2 to a high level, and sets the signals S1 and S3 to a low level (step S22). Then, the controller 20 sets the signal CE2$n$ to a low level, and sets the signals CE1$n$ and CE3$n$ to a high level (step S23). As a result, the memory chip 22 is enabled, and the memory chips 21 and 23 are disabled.

When the POS terminal 1 is located in the warehouse (step S14, YES), the processor 10 sets the signal S3 to a high level, and sets the signals S1 and S2 to a low level (step S24). Then, the controller 20 sets the signal CE3$n$ to a low level, and sets the signals CE1$n$ and CE2$n$ to a high level (step S25). As a result, the memory chip 23 is enabled, and the memory chips 21 and 22 are disabled.

When the POS terminal 1 is located neither on the cradle 100 nor in the store space and the warehouse (step S14, NO), the processor 10 sets all of the signals S1 to S3 to a low level (step S26). Then, the controller 20 sets all of the signals CE1$n$ to CE3$n$ to a high level (step S27). As a result, all of the memory chips 21 to 23 are disabled.

Figure 9:
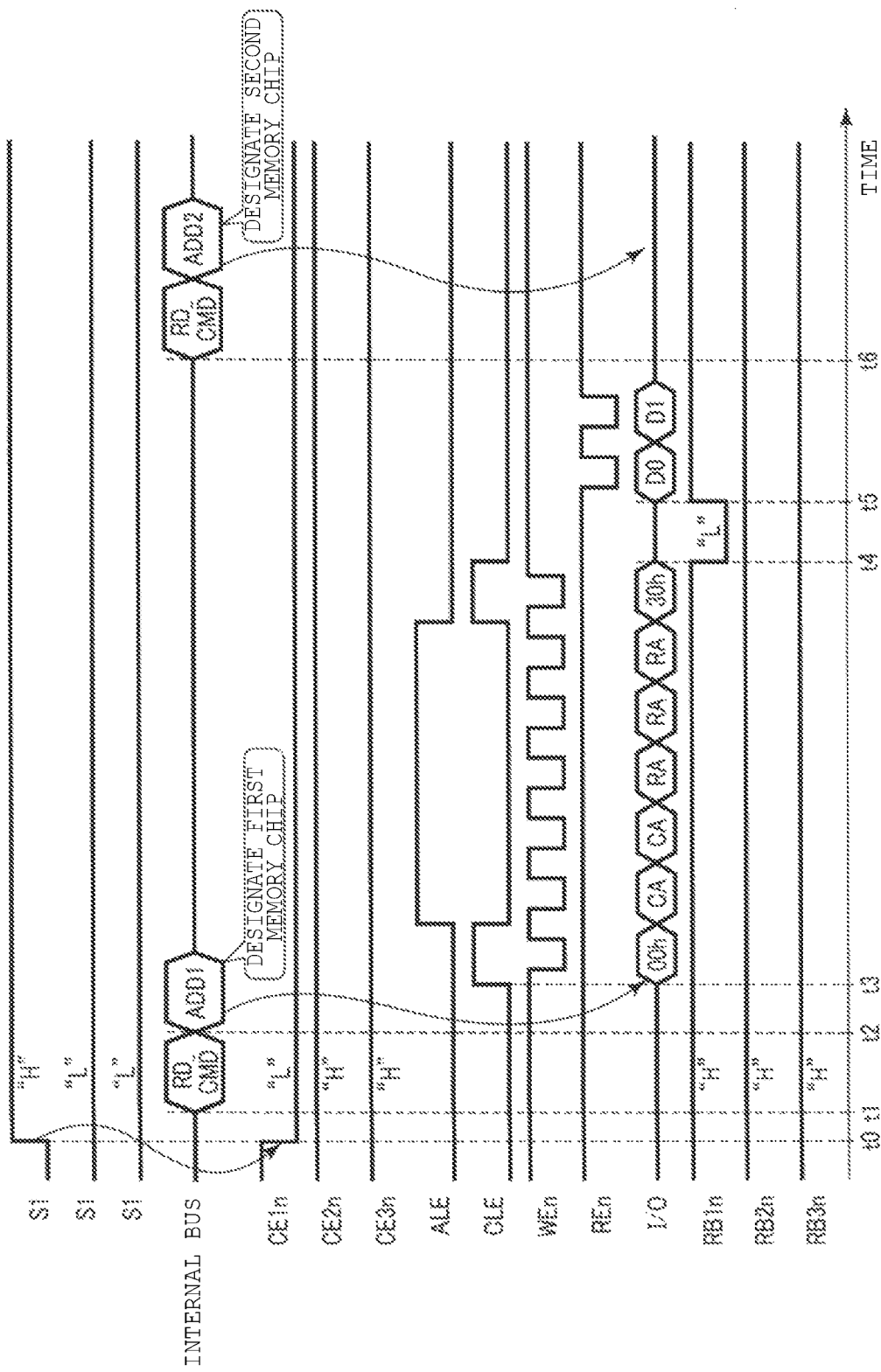
FIG. 9 is a timing chart of various signals processed in the POS terminal according to the second embodiment.

A specific example of the above operation will be described with reference to FIG. 9. FIG. 9 is a timing chart of various signals when the user selects the checkout function and the order receipt with respect to the POS terminal 1 on the cradle 100.

As illustrated in FIG. 9, since the POS terminal 1 is set on the cradle 100, information indicating the location of the POS terminal 1 is transmitted to the processor 10 from the electrode 5, for example. Accordingly, the processor 10 sets the signal S1 to a high level, and sets the signals S2 and S3 to a low level. Then, the controller having received these signals S1 to S3 sets the signal CE1$n$ to a low level, and sets the signals CE2$n$ and CE3$n$ to a high level. As a result, the memory chip 21 is enabled (time t0).

Thereafter, the POS terminal 1 accepts a selection request of the checkout function from the user. In response to the selection request, the processor 10 issues a read command RD_CMD, and transmits the command RD_CMD to the controller 20 via an internal bus (time t1). Subsequently, the processor 10 transmits an address signal ADD1, which designates a region of the memory chip 21 storing information necessary for the checkout function, to the controller 20 via the internal bus (time t2).

In the memory system 15 that has received the read command RD_CMD and the address ADD1, the controller 20 sets the signal CLE to a high level, issues a command "00h", and transmits the command "00h" to the memory chip 21. The command "00h" is a command for notifying the memory chip of the start of the read operation.

Subsequently, the controller 20 sets the signal ALE to a high level, and transmits a column address CA and a row address RA to the memory chip 21 over five cycles, for example. Thereafter, the controller 20 sets the signal CLE to a high level again, issues a command "30h", and transmits the command "30h" to the memory chip 21. The command "30h" is a command for instructing the memory chip to execute reading of data from the memory cell array. The signal WEn is toggled whenever such a command or address is transmitted, and these signals are input into the memory chip 21 in synchronization with the signal WEn. In addition, these signals are not input into the memory chips 22 and 23 because the signals CE2n and CE3n are set to the high level.

In response to the command "30h", the memory chip 21 starts a read operation, and turns into a busy state (time t4, RB1n="L"). Then, when the reading is completed at a time t5, the memory chip 21 turns into a ready state (RB1n="H"). Thereafter, the controller 20 toggles the signal REn. Then, read data D0 and D1 are transmitted to the controller 20 from the memory chip 21 in synchronization with the signal REn. For example, these data D0 and D1 are stored in the built-in memory 11 via the internal bus, and the POS terminal 1 executes as a POS register.

It is assumed that the user has selected the order receipt function while the POS terminal 1 is set on the cradle 100. Then, the processor 10 issues the read command RD_CMD, and transmits the command RD_CMD to the controller 20 via the internal bus (time t6). Further, the processor 10 transmits an address signal ADD2, which is used to designate a region of the memory chip 22 storing information necessary for the order receipt function, to the controller 20 via the internal bus.

However, the memory chip 22 corresponding to the address ADD2 is in a disable state. Therefore, the controller 20 does not perform the read operation on the memory chip 22. Accordingly, the memory chip 22 maintains the ready state without being in the busy state, and the data are not read from the memory chip 22. As a result, the POS terminal 1 can hardly execute the order receipt function, and the processor 10 displays the message as illustrated in FIG. 6 described in the first embodiment on the liquid crystal display 3.

2.2 Second Example

Next, a second example will be described. The second example corresponds to a case in which the first to third memories are formed of one semiconductor chip.

2.2.1 Configuration of Memory System 15

Figure 10:
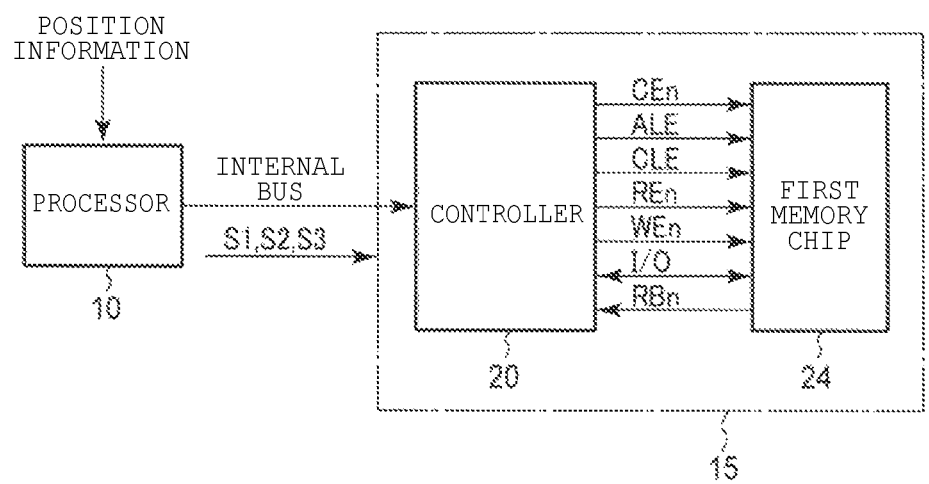
FIG. 10 is a block diagram of the memory system according to the second embodiment.

FIG. 10 is a block diagram of the memory system 15 according to the present example. As illustrated in FIG. 10, the memory system 15 includes one memory chip 24 independently of the controller 20.

Figure 11:
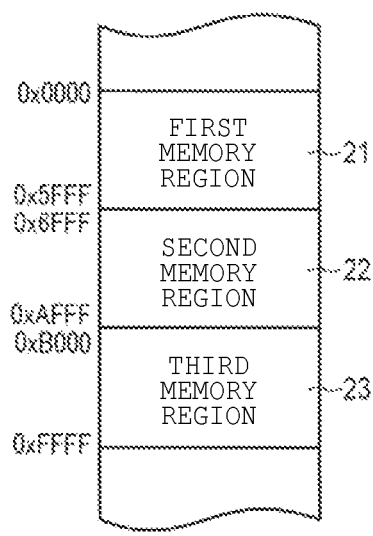
FIG. 11 schematically illustrates a memory space of the memory system according to the second embodiment.

FIG. 11 schematically illustrates a memory space of the memory chip 24. As illustrated in FIG. 11, the memory space of the memory chip 24 has regions of addresses in the range from "0x0000" to "0xFFFF". Among these regions, the region of the address in the range from "0x0000" to "0x5FFF" corresponds to a first memory 21, the region of the address in the range from "0x6000" to "0xAFFF" corresponds to a second memory 22, and the region of the address in the range from "0xB000" to "0xFFFF" corresponds to a third memory 23.

That is, in this example, the first to third memories 21 to 23 are physically one region, but are formed by division of the memory space into these regions. The address illustrated in FIG. 11 is merely an example, and this address may be a logical address to be used when the processor 10 accesses the controller 20 and may be a physical address to be used when the controller 20 accesses the memory chip 24.

2.2.2 Operation of Memory System 15

Figure 12:
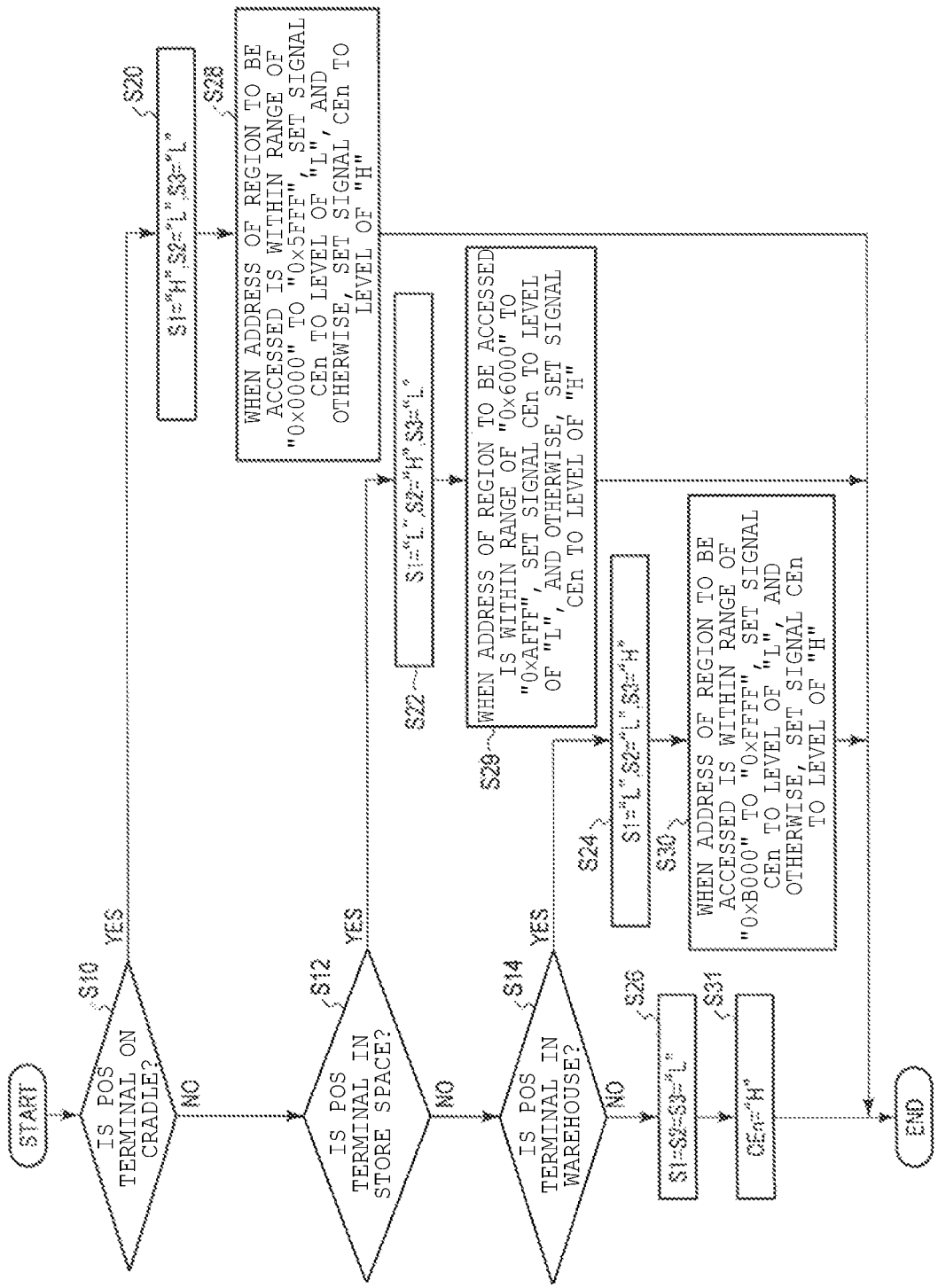
FIG. 12 is a flowchart illustrating an operation of the POS terminal according to the second embodiment.

An operation of the memory system 15 according to the present example will be described below. FIG. 12 is a flowchart illustrating states of the signals S1 to S3 and the chip enable signal CEn when the processor 10 access the memory system 15, and corresponds to FIG. 8 illustrated in the first example.

As illustrated in FIG. 12, when the POS terminal 1 is located on the cradle 100 (step S10, YES), the processor 10 sets the signal S1 to a high level (step S20). Then, the controller 20 sets the signal CEn to a low level in a case where the address of the region to be accessed in the memory chip 24 is within the range from "0x0000" to "0x5FFF", and otherwise sets the signal CEn to a high level (step S28).

When the POS terminal 1 is located in the store space (step S12, YES), the processor 10 sets the signal S2 to a high level (step S22). Then, the controller 20 sets the signal CEn to a low level in a case where the address of the region to be accessed in the memory chip 24 is within the range from "0x6000" to "0xAFFF", and otherwise sets the signal CEn to a high level (step S29).

When the POS terminal 1 is located in the warehouse (step S14, YES), the processor 10 sets the signal S3 to a high level (step S24). Then, the controller 20 sets the signal CEn to a low level in a case where the address of the region to be accessed in the memory chip 24 is within the range from "0xB000" to "0xFFFF", and otherwise sets the signal CEn to a high level (step S30).

When the POS terminal 1 is located neither on the cradle 100 nor in the store space and warehouse (step S14, NO), the processor 10 sets all of the signals S1 to S3 to a low level (step S26). Then, the controller 20 sets the signal CEn to a high level (step S31).

As described above, it may be determined according to the address to be accessed whether the memory chip 24 is enabled. Naturally, any other enabling ways may be used without being limited to the chip enable signal CEn. For example, the signal CEn may always be asserted, and if it is determined that the controller 20 should disable the memory chip 24, the command from the processor 10 may be rejected.

2.3 Third Example

A third example will be described below. The third example is a specified example of the second example, and FIG. 13 illustrates a configuration of a memory chip 24 according to the third example.

Figure 13:
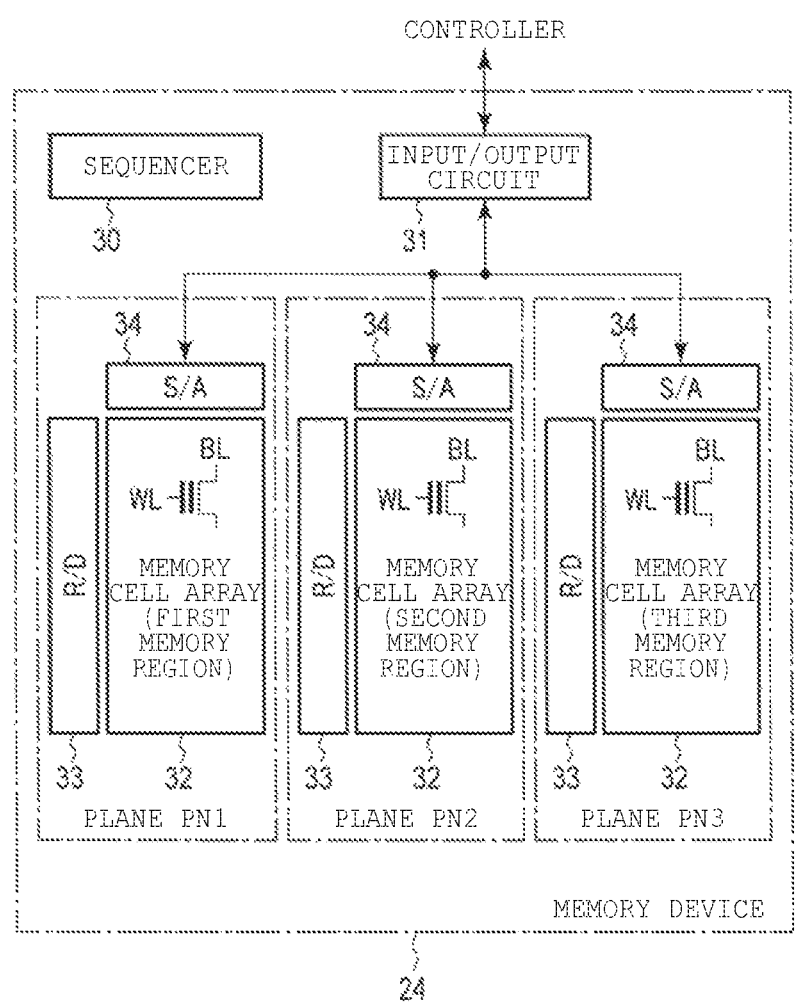
FIG. 13 is a block diagram of a memory device according to the second embodiment.

As illustrated in FIG. 13, the memory chip 24 includes three planes PN1 to PN3. Each of the planes PN1 to PN3 includes a memory cell array 32, a row decoder 33, and a sense amplifier 34. The memory cell array 32 includes a plurality of memory cells of a NAND-type flash memory, a gate of the memory cell is connected to a word line WL, and a drain thereof is connected to a bit line BL. Reading, writing, and erasing of data with respect to the memory cell are performed by the row decoder 33 and the sense amplifier 34. That is, three planes PN1 to PN3 can be operated at the same time, or can be operated independently. Then, three planes PN1 to PN3 are controlled by a sequencer 30 and are connected to a controller 20 via a common input/output circuit 31.

In such a configuration, the planes PN1 to PN3 may function as first to third memories 21 to 23, respectively.

Each of the planes PN1 to PN3 can be designated by a page address of the memory cell array 32, for example.

Naturally, three planes are used, but two or more planes may be used. When two planes are used, for example, a plane PN1 corresponds to the first memory 21, and a plane PN2 corresponds to the second memory 22. Furthermore, when four planes are used, the memory system 15 has four memory regions, wherein planes PN1 to PN4 correspond to first to fourth memories, respectively. Alternatively, the memory system 15 includes two memory regions, wherein planes PN1 and PN2 may correspond to a first memory and planes PN3 and PN4 may correspond to a second memory. In this way, the relation between the number of planes and the respective the memory regions can be appropriately selected.

2.4 Advantage of Second Embodiment

As described above, the first embodiment can be embodied by, for example, the configuration of the second embodiment.

3. Third Embodiment

Next, a memory system according to a third embodiment will be described. In the third embodiment, data are erased to prevent the information leakage when the POS terminal 1 is used without authorization in the first and second embodiments. In the following, differences from the first and second embodiments will be described.

3.1 First Example

Figure 14:
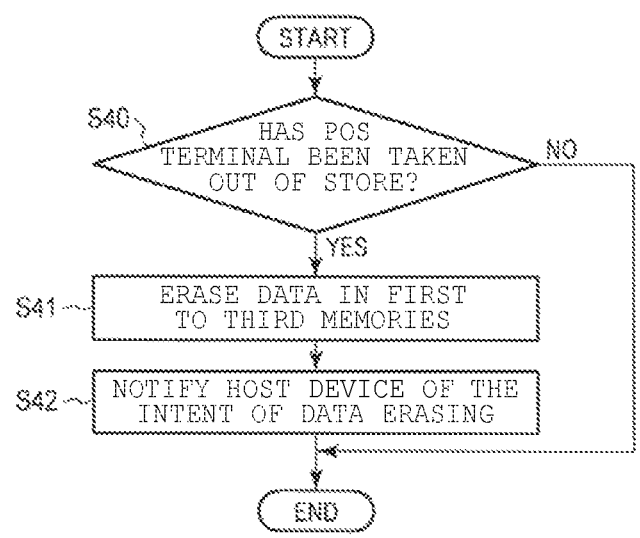
FIG. 14 is a flowchart illustrating an operation of a POS terminal according to a third embodiment.

First, a first example will be described with reference to FIG. 14. FIG. 14 is a flowchart illustrating an operation of the POS terminal 1. In the first example, it is determined whether data are necessarily erased based on position information from the GPS 16.

As illustrated in FIG. 14, the processor 10 determines whether or not the POS terminal 1 is taken out of the store based on the position information received from the GPS 16. In a case where the position information of the GPS 16 indicates the outside of the store (step S40, YES), the processor 10 commands the memory system 15 to erase the data. Then, the controller 20 of the memory system 15 erases the data stored in the memories 21 to 23 in response to the command from the processor 10 (step S41).

Figure 15:
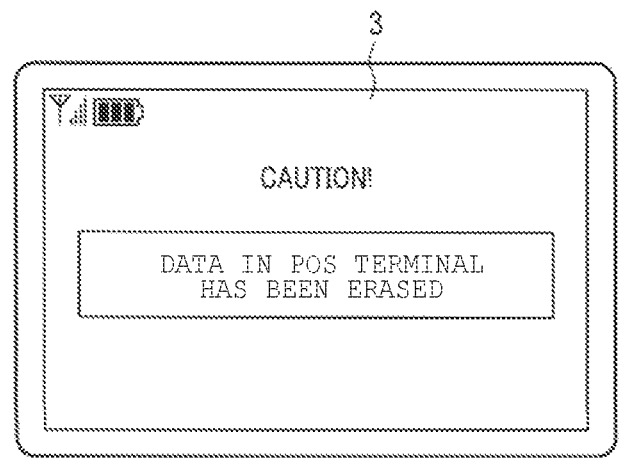
FIG. 15 schematically illustrates a screen displayed on a liquid crystal display of the POS terminal according to the third embodiment.

When the data are completely erased, the controller 20 informs the fact to the processor 10. Then, the processor 10 displays a message indicating that the data are erased, on the liquid crystal display 3. FIG. 15 illustrates the situation. The processor 10 transmits information that the data are erased to the host device 200 using the radio communication unit 18 (step S42).

3.2 Second Example

Next, a second example will be described. In the second example, an electronic merchandise monitoring system is used to determine whether the POS terminal 1 is taken out of the store.

Figure 16:
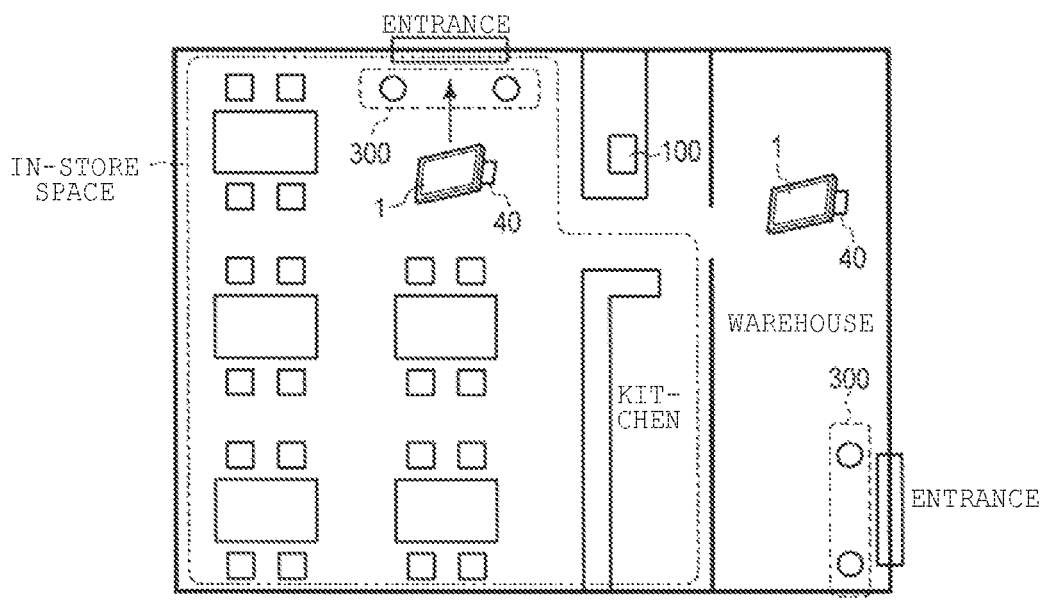
FIG. 16 is an in-store layout in which the POS terminal according to the third embodiment is used.

FIG. 16 illustrates an in-store layout used by the POS terminal 1 according to the second example in correspondence with FIG. 3 described in the first embodiment. As illustrated in FIG. 16, the example is different from FIG. 3 in that an electronic tag 40 is attached to the POS terminal 1, and a detection gate 300 is provided in the entrance of the store to detect the electronic tag 40.

As a method of detecting the electronic tag 40 with the gate 300, various well-known methods can be employed. For example, a magnetoacoustic method, a radio-frequency method, and the magnetic method may be used.

According to the magnetoacoustic method, the tag 40 has a structure in which a plurality of thin metal plates is arranged in parallel. This structure makes the tag 40 resonate with a radio wave having a specific frequency. When the gate 300 transmits the radio wave, the tag 40 receives and resonates with the radio wave, and outputs a weak radio wave. The gate 300 detects that the POS terminal 1 is taken out of the store by receiving the weak radio wave.

According to the radio-frequency method, the tag 40 has an RF structure containing a coil and a capacitor, and resonates with a radio wave having a specific frequency. When the gate 300 transmits the radio wave, the tag 40 that received the radio wave resonates and radiates the radio wave again. A distortion generated at that time is detected by the gate 300.

According to the magnetic method, the tag is made of a magnetic material. When the gate 300 generates a magnetic field, the gate 300 detects the distortion of the magnetic field generated by the tag.

Figure 17:
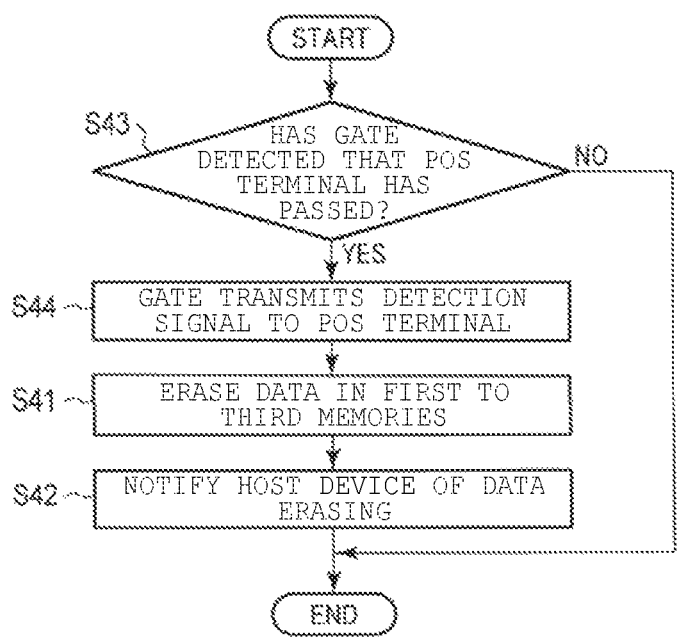
FIGS. 17 and 18 each are a flowchart illustrating an operation of the POS terminal according to the third embodiment.

FIG. 17 is a flowchart illustrating an operation of the POS terminal 1 according to the present example. As illustrated in FIG. 17, when it is detected that the POS terminal 1 passes (step S43, YES), the gate 300 wirelessly transmits a detection signal to the POS terminal 1 (step S44).

In the POS terminal 1 which receives the detection signal by the ratio communication unit 18, the processor 10 commands the memory system 15 to erase the data. Then, the data in the memories 21 to 23 are erased through step S41 and S42 described in the first example, and the fact is informed to the host device 200.

3.3 Third Example

Next, a third example will be described. In the third example, an access from an unauthorized host device to the POS terminal 1 is prevented.

Figure 18:
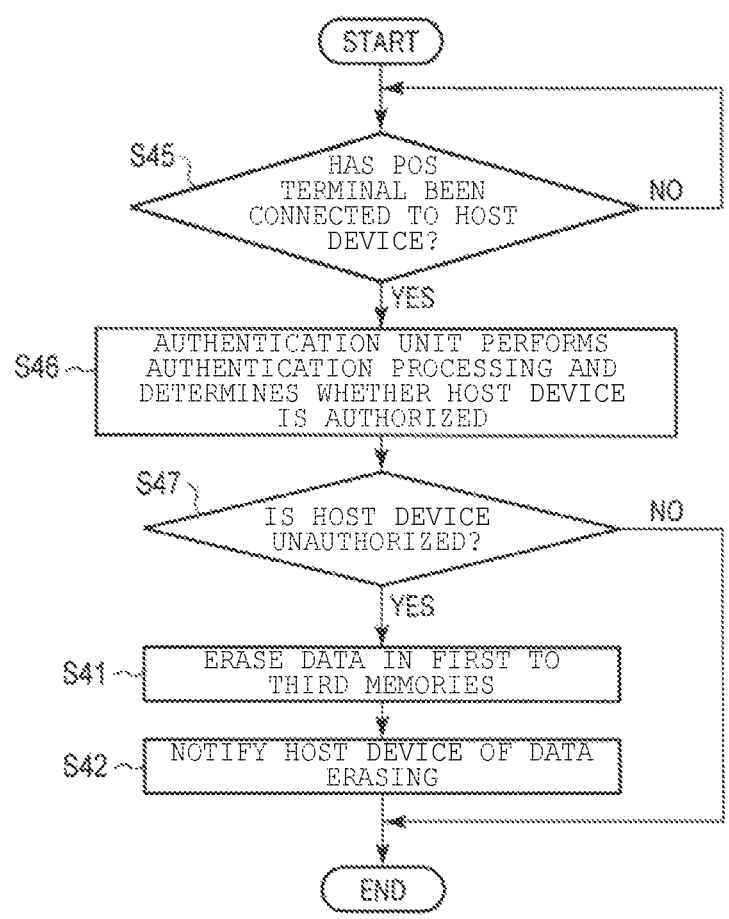

FIG. 18 is a flowchart illustrating an operation of the POS terminal 1 according to the third example. As illustrated in FIG. 18, when the POS terminal 1 is connected to the host device 200 through the cradle 100 or directly without through the cradle 100 and in a wired or wireless manner (step S45, YES), the processor 10 commands the authentication unit 17 to perform authentication processing. Then, the authentication unit 17 performs the authentication processing with respect to the host device 200, and determines whether the connected host device 200 is an authorized device (step S46).

In a case where the authentication unit 17 determines that the host device 200 is an unauthorized device (step S47), the processor 10 commands the memory system 15 to erase the data. Thereafter, the data in the memories 21 to 23 are erased by the processes in steps S41 and S42 described in the first example, and the fact is informed to the host device 200.

3.4 Advantage of Third Embodiment

According to the third embodiment as described above, when the POS terminal 1 is taken to an unexpected place or is accessed by an unauthorized device, such an event is detected and the data in the memories 21 to 23 are erased. Therefore, it is possible to prevent that the important data leak.

In the first to third examples, it is assumed that all data in the memories 21 to 23 are erased. However, only a predetermined part of the data may be erased. The minimum part (for example, OS) of data necessary for the POS terminal 1 as the information terminal may be excluded from the erasing target. After step S41, the access to the memory system 15 may be prohibited. An exemplary method of prohibiting the access is similar to the method described in the second embodiment.

4. Fourth Embodiment

Next, a memory system according to a fourth embodiment will be described. In the fourth embodiment, the first to third embodiments are applied to the BYOD.

4.1 Configuration

Figure 19:
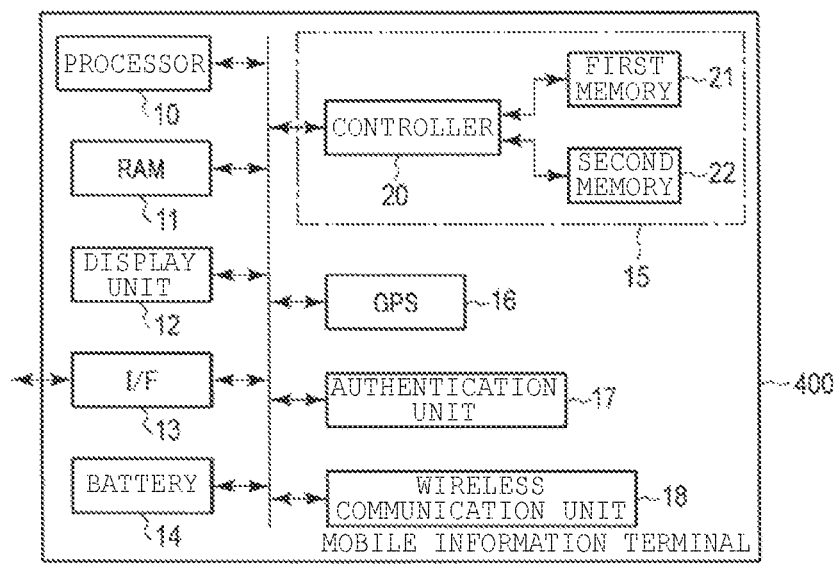
FIG. 19 is a block diagram of a mobile information terminal according to a fourth embodiment.

FIG. 19 is a block diagram of a mobile information terminal according to the fourth embodiment. As illustrated in FIG. 19, the mobile information terminal 400 is configured such that the memory region of the memory system 15 described in FIG. 2 is divided into two memories 21 and 22. Then, the memory 21 is used for business usage, and the memory 22 is used for personal usage. Of course, these usages are given as merely exemplary, the memories may be used for any other usage, and both memories are used different usages. The mobile information terminal 400 is, for example, a tablet terminal, a smart phone, or a note PC.

4.2 Method to Access Memories 21 and 22

Next, a method to access the memories 21 and 22 will be described.

4.2.1 First Example

Figure 20:
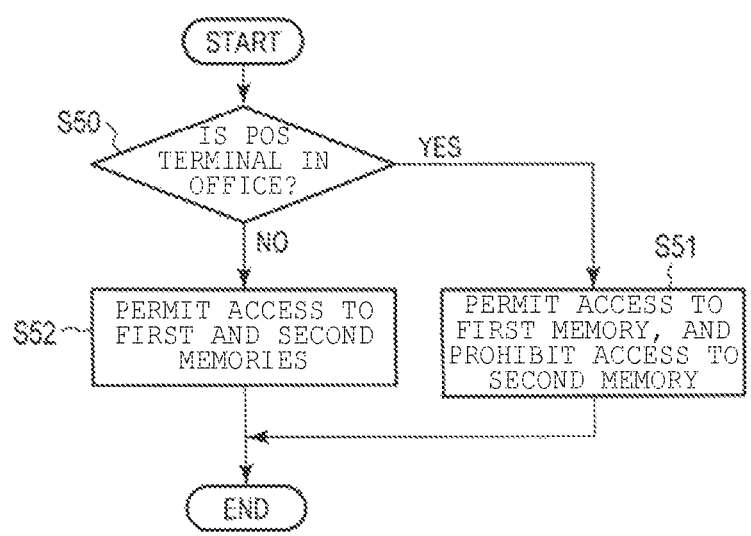
FIGS. 20-22 each are a flowchart illustrating an operation of the mobile information terminal according to the fourth embodiment.

A first example describes restriction of access to the memories 21 and 22 according to the position information of the mobile information terminal 400. FIG. 20 is a flowchart illustrating an operation of the mobile information terminal 400.

As illustrated in FIG. 20, in a case where the mobile information terminal 400 is in a company (step S50, YES), the access to the first memory 21 is permitted, and the access to the second memory 22 is prohibited (step S51). In other words, the access to a business memory region in the memory system 15 is permitted, but the access to a personal memory region is prohibited.

On the other hand, in a case where the mobile information terminal 400 is in a place other than the company (step S50, NO), the accesses to both the first memory 21 and the second memory 22 are permitted (step S52). In a case where the mobile information terminal 400 is in a place other than the company, the access to the first memory 21 may be prohibited in viewpoint of data protection.

4.2.2 Second Example

Figure 21:
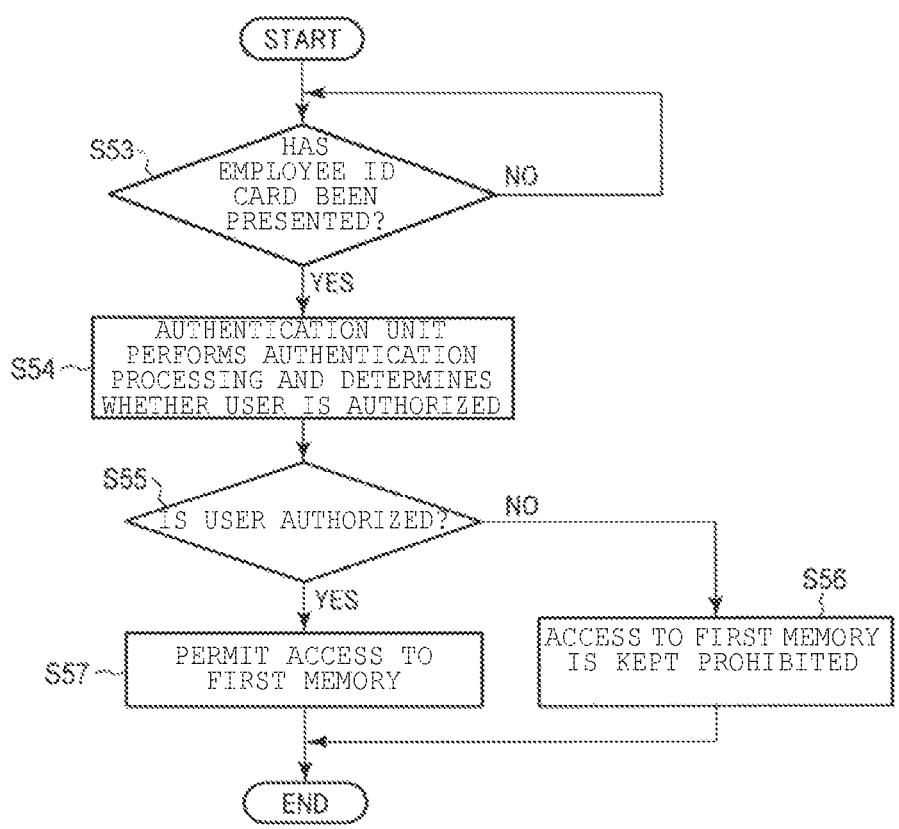

A second example describes prohibition of access to the business memory region 21 based on an ID card. FIG. 21 is a flowchart illustrating an operation of the mobile information terminal 400. In the second example, the access to the memory 21 is basically prohibited, and when an employer card embedded with an IC chip for storing personal information is presented to the authentication unit 17, the access to the memory 21 is permitted.

That is, when the employer card is presented to the authentication unit 17 (step S53, YES), the authentication unit 17 reads the personal information from the IC chip, and performs the authentication processing. Then, it is determined whether or not a user who tries to use the mobile information terminal 400 is an authorized user (step S54).

As a result of the authentication processing, in a case where it is determined that the user is an authorized user (step S55, YES), the access to the first memory 21 is permitted (step S57). On the other hand, in a case where it is determined that the user is not authorized (step S55, NO), the access to the first memory 21 is left in the prohibited state (step S56).

In a case where it is determined that the user is unauthorized, the access to the first memory 21 is prohibited, and also the data in the first memory 21 may be erased similarly to the third embodiment.

4.2.3 Third Example

Figure 22:
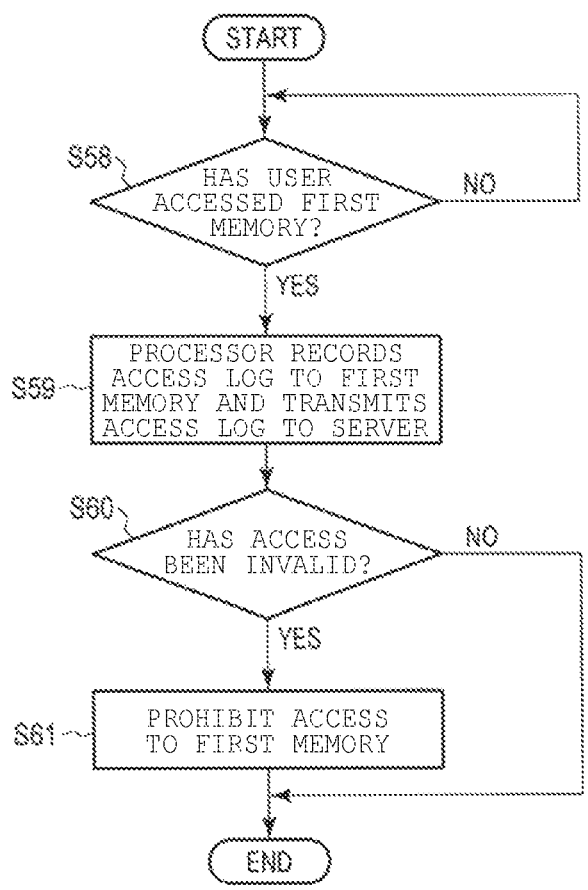

A third example describes restriction of the access to the first memory 21 when there is an unauthorized access to the first memory 21. FIG. 22 is a flowchart illustrating an operation of the mobile information terminal 400.

For example, it is assumed that the user accesses the first memory 21 according to the method of the first or second example (step S58, YES). Then, the processor 10 records the access log of the first memory 21 in the built-in memory 11 for example, and transmits the access log to a server of the company (step S59).

Then, in a case where an unauthorized access is found out while the user uses the mobile information terminal 400 (step S60, YES), the processor 10 prohibits the access to the first memory 21 (step S61).

In a case where it is determined that there is an unauthorized access, the access to the first memory 21 is prohibited and also the data in the first memory 21 may be erased similarly from the third embodiment.

4.3 Advantage of Fourth Embodiment

In the BYOD where a personal mobile information terminal is used also for business usage, it is very important to prevent the leakage of important data (client data) for business usage for example. Similarly, there may be lots of personal information in the mobile information terminal, and thus it is necessary to protect the information from the attack from the outside.

According to the fourth embodiment, an unauthorized access can be prevented while permitting the authorized user to access the appropriate memory region.

Figure 23:
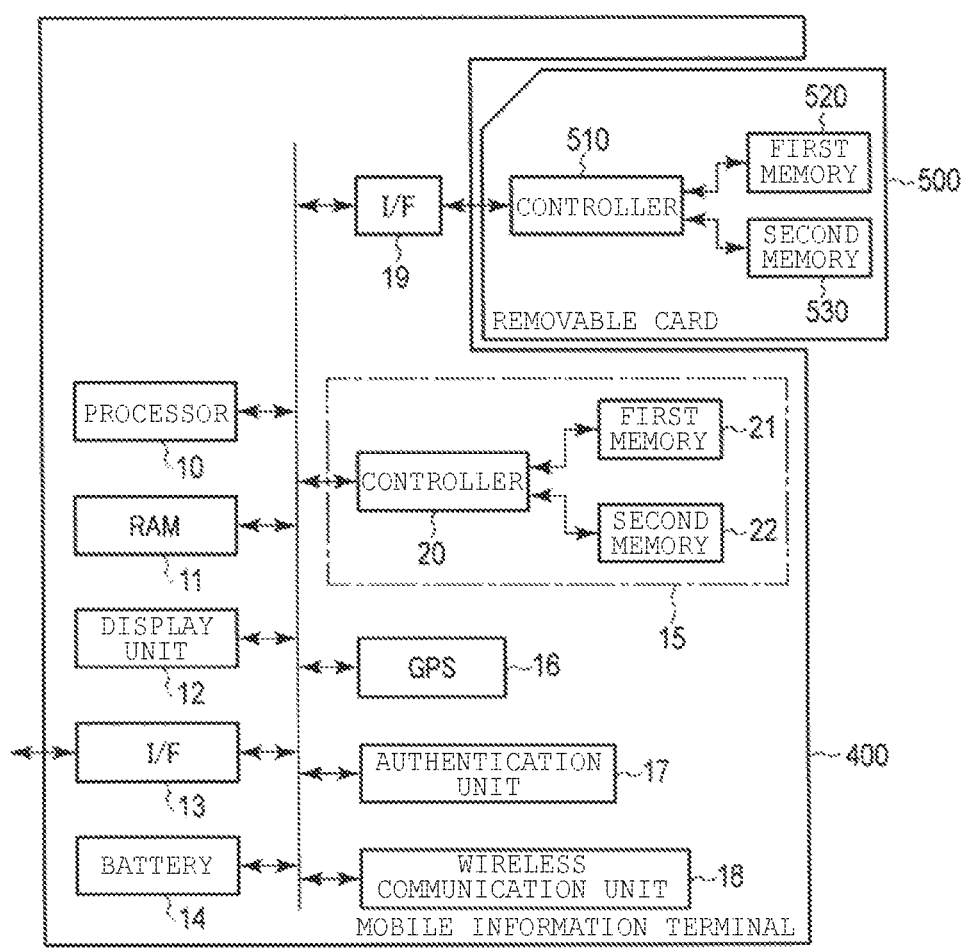
FIG. 23 is a block diagram of a mobile information terminal according to a modified example of the fourth embodiment.

In the first to fourth embodiments, it is assumed that the memory system 15 is embedded in the POS terminal 1 or the mobile information terminal 400. However, the first to fourth embodiments can be applied also to a removable device. FIG. 23 illustrates an example of the mobile information terminal 400.

As illustrated in FIG. 23, the mobile information terminal 400 includes a card slot where a removable card such as an SD card can be detachably attached. The removable card 500 including the card slot can communicate with the processor 10 through the interface circuit 19.

The removable card 500 includes the controller 20 and the plurality of memories 21 and 22 (or three memories as described in the first to third embodiments) similarly to the memory system 15. According to such a configuration, the access manner described in the first to fourth embodiments may be applied to the removable card 500.

5. Fifth Embodiment

A memory system according to a fifth embodiment will be described below. In the fifth embodiment, technology for preventing information leakage described in the first to forth embodiments is applied to a removable card. In the following, a memory card such as an SD card will be described as an example of the removable card.

5.1 Configuration of Memory Card

Figures 24, 25:
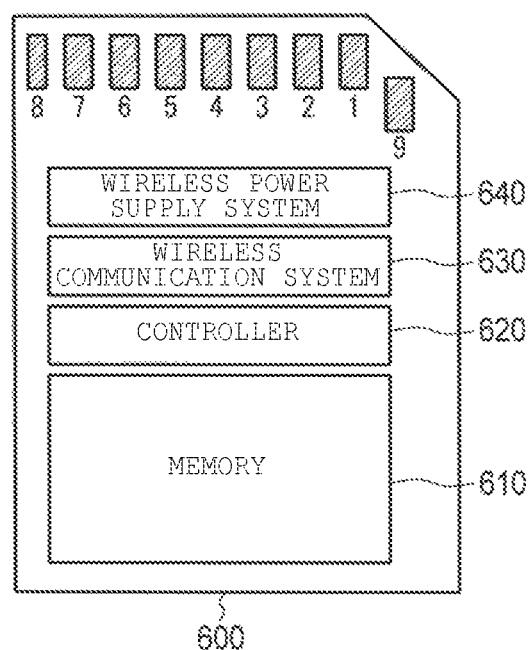
FIG. 24 is a block diagram of a removable card according to a fifth embodiment.
FIG. 25 is a table showing a pin arrangement of the removable card according to the fifth embodiment.

First, a configuration of the memory card according to the fifth embodiment will be described. FIG. 24 schematically illustrates the memory card according to the fifth embodiment.

As illustrated in FIG. 24, a memory card 600 includes a semiconductor memory 610, a controller 620, a wireless communication system 630, a wireless power supply system 640, and a plurality of signal pins (first to ninth pins).

The memory 610 stores data in a nonvolatile manner. The memory 610 is, for example, an NAND-type flash memory, and corresponds to the first to third memories 21 to 23 described in the first to fourth embodiments, for example.

For example, the controller 620 controls access to the memory 610 in response to a command from a host device. That is, the controller 620 controls writing, reading, and erasing of data with respect to memory 610, and corresponds to the controller 20 described in the first to fourth embodiments, for example.

The wireless communication system 630 receives data from the host device by wireless communication, and transmits data to the host device, based on the command of the controller 620, by wireless communication. The wireless communication system 630 corresponds to the wireless communication unit 18 described in the first to fourth embodiments, for example.

The wireless power supply system 640 can wirelessly receive power. As a method of supplying power wirelessly, an electromagnetic induction method, an electromagnetic field resonance method, or a radio wave method can be employed. According to the electromagnetic induction method, power is received by electromagnetic induction using a coil. According to the electromagnetic field resonance method, power is transmitted and received through coupling of a resonance field between two resonators resonating with a coil and a capacitor. According to the radio wave method, power is converted into electromagnetic waves, and the converted power is transmitted and received via an antenna. For long-distance power transmission, the radio wave method is usually superior.

The plurality of signal pins is electrically connected to the controller 620. In the plurality of signal pins, for example, signals are assigned to first to ninth pins, respectively, as illustrated in FIG. 25. FIG. 25 is a table indicating the first to ninth pins and signals that are respectively assigned to the pins.

As illustrated in FIG. 25, data 0 to data 3 are assigned to the first pin, the seventh pin, the eighth pin, and the ninth pin, respectively. A card detection signal is also assigned to the first pin. A command is assigned to the second pin, a ground potential Vss is assigned to the third and sixth pins, a power-supply potential Vdd is assigned to the fourth pin, and a clock signal is assigned to the fifth pin.

In the above configuration, the memory card 600 is formed to be inserted and removed into/from a card slot provided in the host device as described in FIG. 23. When the memory card 600 is inserted into host device, the host device communicates various signals and data with the controller 620 in the memory card 600 via the first to ninth pins. That is, when being inserted into the card slot of the host device, the memory card 600 receives power from the host device via the third, fourth, and sixth pins by wired connection and is operated using the received power as a power source voltage. In addition, the signal is also transmitted and received to/from the host device via the first, second, fifth, and seventh to ninth pins by wired connection. The signal may be transmitted and received to/from another host device using wireless communication by the wireless communication system 630.

On the other hand, when the memory card 600 is not inserted into the card slot of the host device, the memory card 600 receives wirelessly power by the wireless power supply system 640 and is operated using the received power as a power source voltage. In addition, the signal is also transmitted and received to/from the host device in a wireless manner by the wireless communication system 630.

Figure 26:
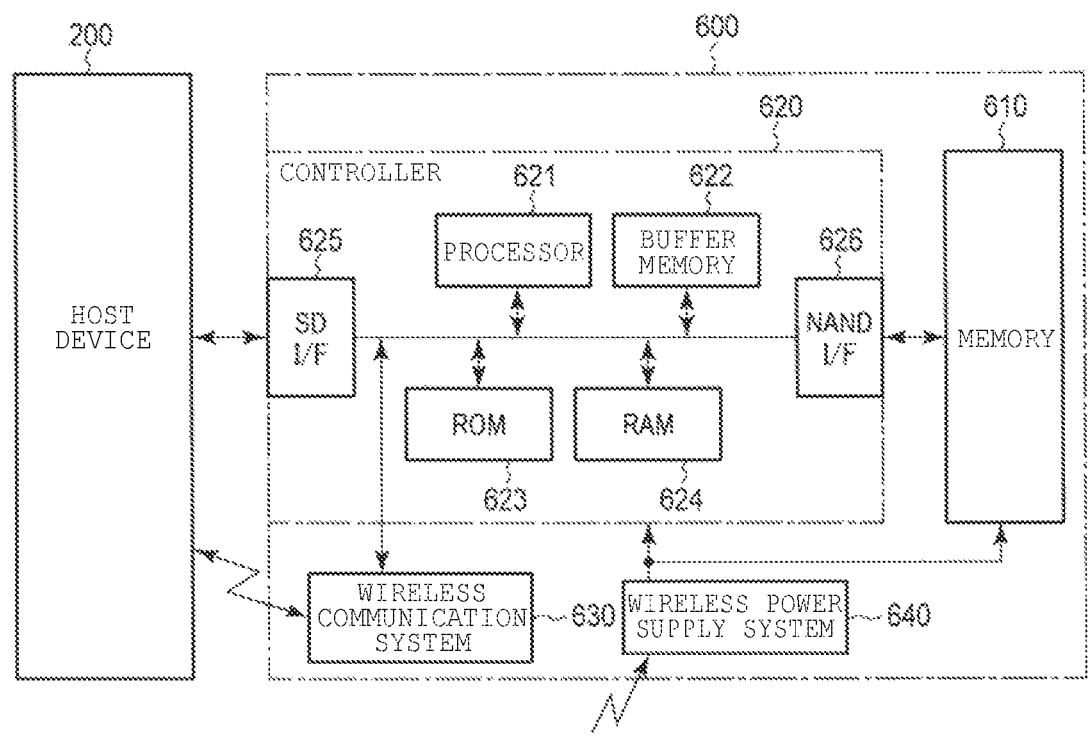
FIG. 26 is a block diagram of the removable card according to the fifth embodiment.

FIG. 26 is a block diagram of the memory card 600, and particularly illustrates a configuration of the controller 620 in detail. As illustrated in FIG. 26, the controller 620 includes a processor (for example, CPU) 621, a buffer memory 622, a ROM (Read-only memory) 623, a RAM (Random access memory) 624, an SD interface 625, and a NAND interface 626, which are communicably connected to each other via a bus.

The SD interface 625 performs interface processing between the controller 620 and the host device when the memory card 600 is inserted into the card slot. In the present embodiment, the interface according to an SD standard is described as an example, but any another bus may be used between the host device 200 and the memory card without being limited to the SD standard.

The processor 621 controls an overall operation of the memory card 600. For example, the processor 621 reads firmware (control program), which is stored in the ROM 623, and load the read firmware on the RAM 624 when the power source is supplied to the memory card 600 in the wired or wireless manner, and creates various tables in the RAM 624 in accordance with a predetermined process of the firmware. One of these tables is FAT (File allocation table). The RAM 624 is volatile semiconductor memory such as SRAM. Naturally, the RAM 624 may be a nonvolatile semiconductor memory. In addition, the processor 621 receives a write command, a read command, and an erase command from the host device, and executes a predetermined process on the memory 610.

The ROM 623 stores the control program or the like which is controlled by the processor 621. The RAM 624 is used as a work area of the processor 621 and stores the control program or various tables. The NAND interface 626 performs the interface processing between the controller 620 and the memory 610. The buffer memory 622 temporarily stores data to be written into the memory 610 received from the host device, and temporarily stores data read from the memory 610.

The wireless communication system 630 can communicate with the functional blocks included in the controller 620. For example, the wireless communication system 630 transmits the data stored in the buffer memory 622 to the host device by wireless communication in accordance with the command of the processor 621 and stores the data received from the host device in the buffer memory 622. The wireless communication system 630 may be a part of the controller 620.

As described above, the wireless power supply system 640 receives the power in the wireless manner, and supplies the power to the controller 620 and the memory 610. The wireless power supply system 640 may also be a part of the controller 620.

5.2 Operation of Memory Card 600

Figure 27:
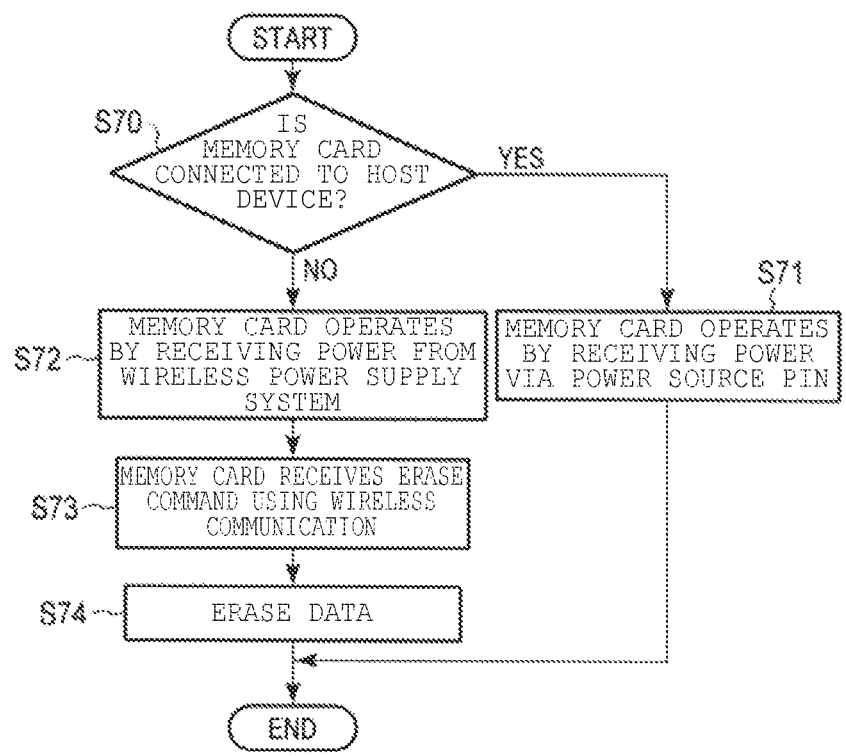
FIG. 27 is a flowchart illustrating an operation of the removable card according to the fifth embodiment.

Next, an operation of the memory card 600 will be described. The operation relates to prevention of information leakage when the memory card 600 is lost. FIG. 27 is a flowchart illustrating the operation of the memory card 600.

As illustrated in FIG. 27, when the memory card 600 is inserted into the card slot of the host device 200 (step S70, YES), the memory card 600 operates by receiving the power from the host device by wired connection via the power source pins (step S71).

On the other hand, when the memory card 600 is not inserted into the card slot of the host device 200 (step S71, NO), the memory card 600 operates by receiving the power from the wireless power supply system (step S72). At this time, the user may lose the memory card 600 and not grasp the location of the memory card 600. In this case, the user transmits an erase command of data to the memory card 600 from the host device 200 through wireless communication.

When the memory card 600 receives this erase command in the wireless communication system 630 (step S73), the processor 621 erases the data stored in the memory 610 in response to the command (step S74).

5.3 Advantage of Fifth Embodiment

According to the fifth embodiment, it is possible to effectively prevent the information leakage. This advantage will be described below.

A removable storage medium such as a memory card is gradually reduced in size together with an increase in storage capacity every year. Then, the user may also frequently lose the storage medium. In this case, important data such as customer data or personal information recorded in the storage medium may be read by a third party without authorization.

In this regard, according to the fifth embodiment, when the user becomes aware of the loss of the storage medium, the user transmits an erase command of data to the memory card 600 from the host device through the wireless communication. Then, in accordance with the erase command, the memory card 600 to be operated by the wireless power supply system erases the data stored in the memory 610.

In this way, as long as the wireless communication with the host device 200 can be performed and the memory card is in the range where the power can be supplied by the wireless power supply system, the user can erase the data stored in the memory card 600 through the host device 200. Accordingly, it is possible to effectively prevent information leakage from the lost memory card 600.

All data stored in the memory 610 may be erased, or only some data may be erased as described in the third and fourth embodiments. In addition, the erase command may be provided as a special command different from a normal erase command.

6. Sixth Embodiment

A memory system according to a sixth embodiment will be described below. In the sixth embodiment, data are erased when an unauthorized host is connected to the removable card described in the fifth embodiment. In the following, differences from the fifth embodiment will be described.

6.1 Configuration of Memory Card

Figure 28:
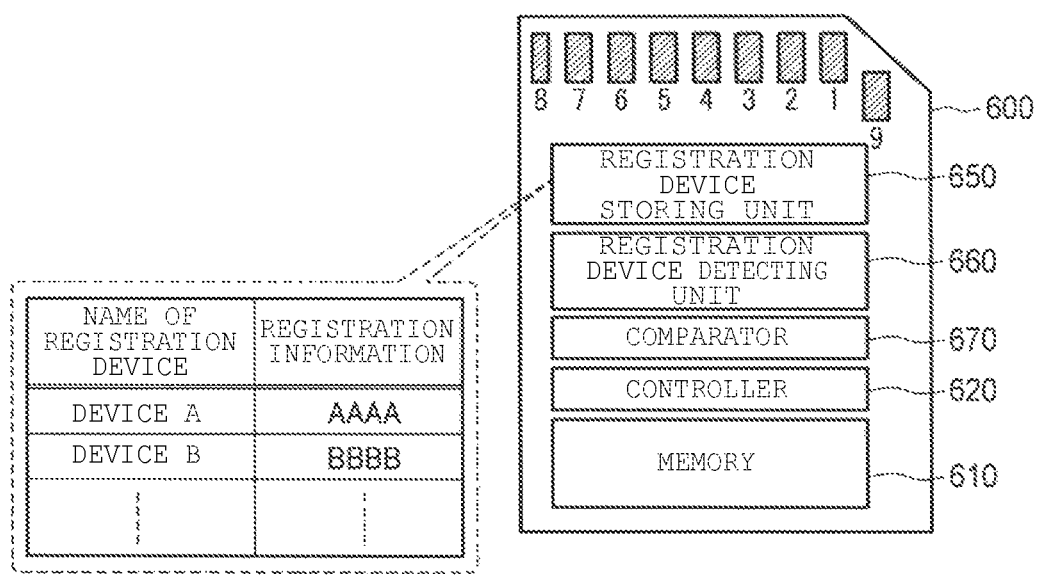
FIG. 28 is a block diagram of a removable card according to a sixth embodiment.

FIG. 28 schematically illustrates a configuration of the memory card according to the sixth embodiment. As illustrated in FIG. 28, a memory card 600 includes a registration device storing unit 650, a registration device detecting unit 660, and a comparator 670 instead of the wireless communication system 630 and the wireless power supply system 640 illustrated in FIG. 24 described according to the fifth embodiment.

The registration device storing unit 650 is, for example, a nonvolatile semiconductor memory, and stores information on the host device that is permitted to access the memory card 600. For example, in FIG. 28, the name of the host device (name of registration device) permitted to access the memory card 600 and information (registration information) unique to the host device are stored. More specifically, information "AAAA" on a host device A and information "BBBB" on a host device B are stored as registration information (at least registration information may be stored).

The registration device detecting unit 660 reads device information corresponding to the above-described registration information from the host device when the memory card 600 is inserted into the host device.

The comparator 670 compares the information stored in the registration device storing unit 650 with the information read from the registration device detecting unit 660, and transmits the comparison result to the controller 620.

At least one of the registration device storing unit 650, the registration device detecting unit 660, and the comparator 670 may be a part of the controller 620, and the registration device storing unit 650 may be a part of the memory 610.

6.2 Operation of Memory Card

Figure 29:
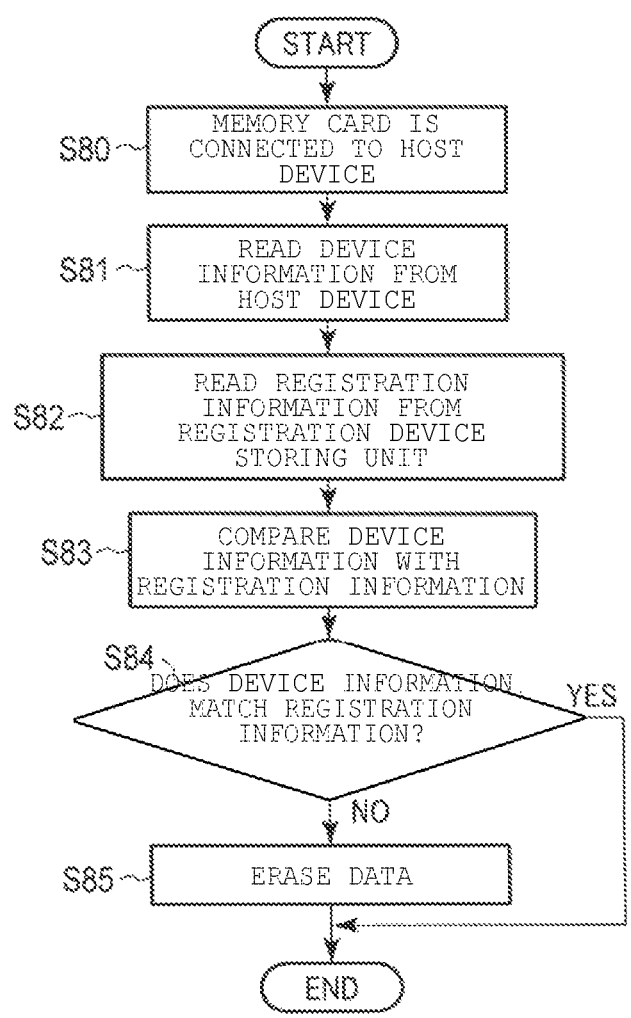
FIG. 29 is a flowchart illustrating an operation of the removable card according to the sixth embodiment.

FIG. 29 is a flowchart illustrating an operation of the memory card 600 when the memory card 600 is inserted into the card slot of the host device.

As illustrated in FIG. 29, when the memory card 600 is inserted into the card slot (step S80), the registration device detecting unit 660 reads the device information from the host device (step S81), and transmits the information to the comparator 670. In addition, the comparator 670 also reads the registration information from the registration device storing unit 650 (step S82). Then, the comparator 670 compares the device information read from the host device with the registration information read from the registration device storing unit 650 (step S83).

As a result of the comparison, when two types of information do not match (step S84, NO), the controller 620 erases the data stored in the memory 610. When a plurality of types of registration information are registered in the registration device storing unit 650, all or some types of registration information may be compared with the read registration information.

In the above-described operation, for example, the controller 620 of the memory card is voluntarily executed without waiting for the command from the host device when it is detected that the memory card is connected to the host device.

6.3 Operation of Host Device

Figure 30:
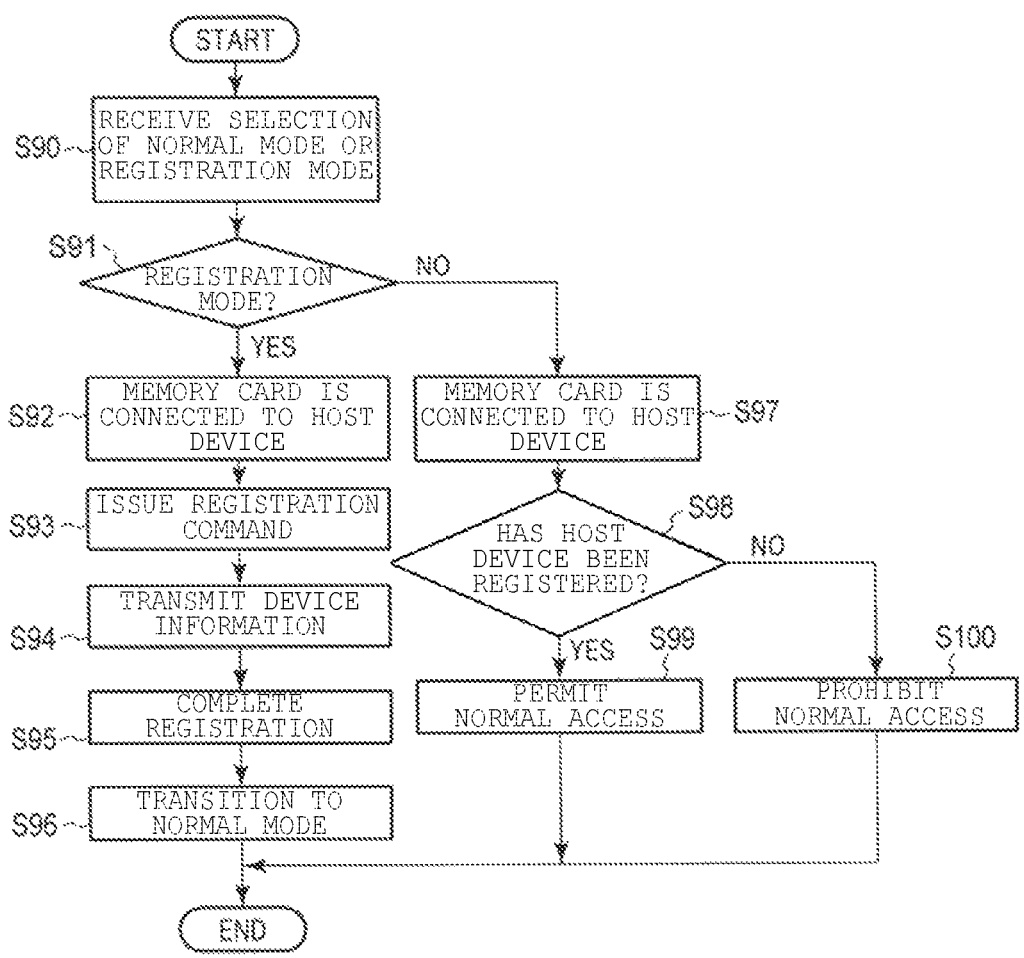
FIG. 30 is a flowchart illustrating an operation of a host device according to the sixth embodiment.

FIG. 30 is a flowchart illustrating an operation of the host device according to the sixth embodiment. The host device can operate in two operation modes of a normal mode and a registration mode. In the normal mode, the access to the memory card 600 is enabled through the process illustrated in FIG. 29. On the other hand, in the registration mode, when a certain memory card 600 is first inserted into an unregistered host device, a registration operation of the device information is performed on the memory card 600 so as to prove that the unregistered host device is an authorized host device.

As illustrated in FIG. 30, first, the host device receives selection of either the normal mode or the registration mode from the user (step S90). Then, the processor of the host device transitions to the selected mode.

When the memory card 600 is inserted into the card slot in a state where the host device is in the registration mode (step S91, YES), the processor of the host device detects that the memory card 600 is inserted into the card slot, issues a registration command, and transmits the command and to the memory card 600 (step S93). This command is a command for requesting the memory card 600 to register the device information on the host device in the registration device storing unit 650. Subsequently, the host device transmits device information unique to the host device to the memory card 600 (step S94). Since the device information is used to prove that the host device is an authorized device, for example, the device information may be stored in a region inaccessible from the outside or may be encrypted except when the device information is registered in the memory card 600.

When the registration of the device information in the memory card 600 is completed by recording of the device information in the registration device storing unit 650 (step S95), the host device transitions to the normal mode (step S96), and the processor of the host device normally accesses the memory card.

In step S91, when the memory card is inserted into the card slot in the case where the host device is in the normal mode (step S91, NO), the memory card 600 performs authentication processing as illustrated in FIG. 29. Then, if the host device has already been registered in the memory card 600 (step S98, YES), the host device can normally access the memory card 600 (step S99). On the other hand, if the host device has not been registered in the memory card 600 (step S98, NO), the host device prohibits the access to the memory card 600 (step S100). Alternatively, although the access to the memory card can be performed, all valid data in the memory card 600 has been erased.

6.4 Advantage of Sixth Embodiment

According to the sixth embodiment, as in the third example of the third embodiment, the access to the memory card can be prevented from the unauthorized host device.

The operation according to the sixth embodiment illustrated in FIGS. 29 and 30 assumes that the memory card 600 is inserted into the card slot of the host device. However, the memory card 600 may not be inserted into the card slot. In this case, the memory card 600 includes the wireless communication system 630 and the wireless power supply system 640 in addition to the configuration illustrated in FIG. 28.

Then, the host device accesses the memory card 600 using wireless communication. At this time, the memory card 600 also reads the device information from the host device using wireless communication, and determines whether or not the host device is an authorized device. This is similarly applied to the registration of the device information, and accordingly the registration command and the device information described in steps S93 and S94 of FIG. 30 are transmitted to the memory card 600 by the wireless communication.

Figures 31, 32:
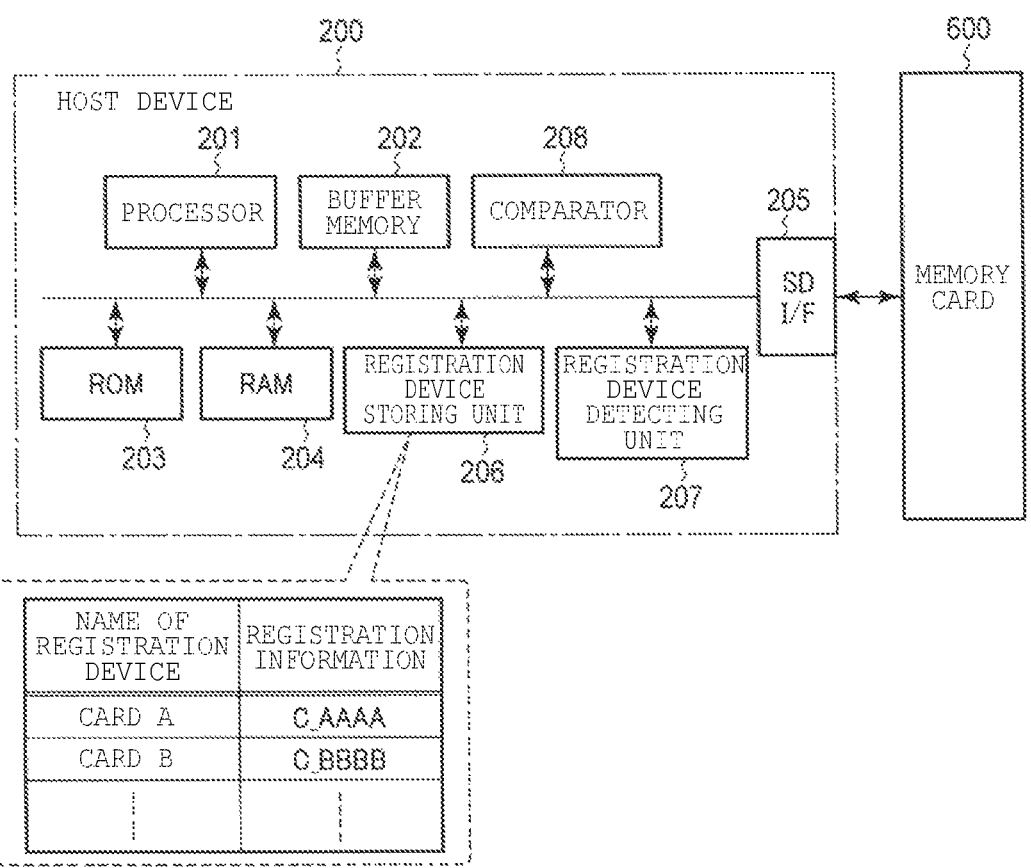
FIG. 31 is a table showing registration information according to a modified example of the sixth embodiment.
FIG. 32 is a block diagram of a host device according to a seventh embodiment.

In the above-described embodiment, it is assumed that where the data stored in the memory card 600 is erased according to the registration information. However, instead of erasing the data, the accessible region can be restricted for each host device as described in the first and second embodiments. For example, the registration device storing unit 650 stores not only the registration information on the registration device information but also the information on the accessible region for each registration device. FIG. 31 illustrates an example of a table stored in the registration device storing unit 650 in such a case. In FIG. 31, a device A is permitted to access an address region in the range from "0x0000" to "0x5FFFF" of the memory card 600, but is rejected to access other regions by the controller 620. In addition, a device B is permitted to access an address region in the range from "0x6000" to "0xAFFFF" of the memory card 600, but is rejected to access other regions by the controller 620.

7. Seventh Embodiment

A memory system according to a seventh embodiment will be described below. The seventh embodiment is different from the sixth embodiment in that a removable card such as a memory card is registered in the host device instead of registering the information on the host device in the memory card in the sixth embodiment described above. In the following, differences from the sixth embodiment will be described.

7.1 Configuration of Host Device

FIG. 32 is a block diagram of a host device according to the seventh embodiment. As illustrated in FIG. 32, a host device 200 includes a processor 201, a buffer memory 202, a ROM 203, a RAM 204, an SD interface 205, a registration device storing unit 206, a registration device detecting unit 207, and a comparator 208.

The SD interface 205 performs interface processing with the interface 625 of the memory card 600 illustrated in FIG. 26. As described above, any another bus may be used between the host device 200 and the memory card 600 without being limited to the SD standard.

The processor 201 controls an overall operation of the host device 200. The processor 201 reads a program stored in the ROM 623, on the RAM 204 when the power source is applied to the host device 200 and executes an operation system (OS). In addition, the processor 201 executes a predetermined application program in response to the request from the user. The RAM 204 is a volatile semiconductor memory such as a DRAM or an SRAM. Naturally, it may be a nonvolatile semiconductor memory. Further, the processor 201 receives the request from the user, and issues a write command, a read command, and an erase command with respect to the memory card, based on the request.

The ROM 203 stores the control program or the like which is executed by the processor 201. The RAM 204 is used as a work area of the processor 621. The buffer memory 202 temporarily stores data to be transmitted and received to/from the memory card 600, for example.

The registration device storing unit 206 is, for example, a nonvolatile semiconductor memory, and corresponds to the registration device storing unit 650 illustrated in FIG. 28 according to the sixth embodiment. The registration device storing unit 206 is different from that of the sixth embodiment in that the former stores not the information in the host device but in the memory card 600. That is, the registration device storing unit 206 stores the name of the memory card (name of registration device), which permits the access of the host device 200 and information (registration information) unique to the memory card 600. In FIG. 32, information "C_AAAA" on a memory card A and information "C_BBBB" on a memory card B are stored as registration information.

The registration device detecting unit 207 corresponds to the registration device detecting unit 660 illustrated in FIG. 28, and reads device information corresponding to the above-described registration information from the memory card 600 when the memory card 600 is inserted into the host device.

The comparator 208 corresponds to the comparator 670 illustrated in FIG. 28. The comparator 208 compares the information stored in the registration device storing unit 206 with the information read from the memory card 600 by the registration device detecting unit 207, and transmits the comparison result to the processor 201.

At least one of the registration device storing unit 206, the registration device detecting unit 207, and the comparator 208 may be a part of the processor 201, and the registration device storing unit 206 may be a part of the memory 204.

7.2 Operation of Host Device 200

Figure 33:
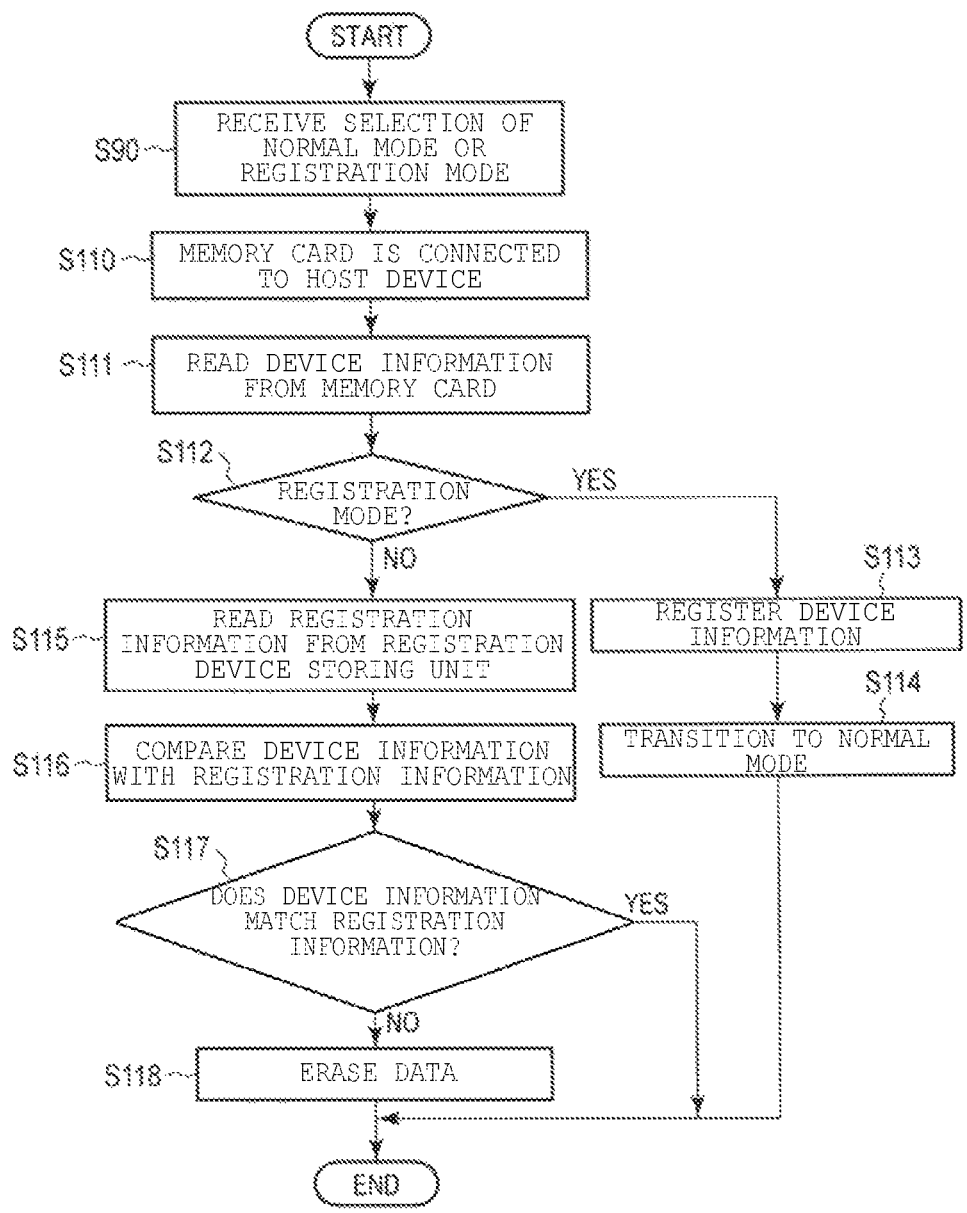
FIG. 33 is a flowchart illustrating an operation of the host device according to the seventh embodiment.

FIG. 33 is a flowchart illustrating an operation of the host device 200 when the memory card 600 is inserted into the card slot.

As in the sixth embodiment, the host device 200 can operate in a normal mode and a registration mode. In the normal mode, the access to the memory card 600 is performed after authentication processing as in the sixth embodiment. On the other hand, in the registration mode, when an unregistered memory card 600 is inserted into the host device, the device information of the memory card 600 is registered in the host device 200 so as to prove that the unregistered memory card is an authorized memory card.

As illustrated in FIG. 33, first, the host device 200 accepts selection of either of the normal mode and the registration mode by the user (step S90). Then, the processor of the host device transitions to the selected mode.

Thereafter, when the memory card 600 is inserted into the card slot (step S110), the registration device detecting unit 207 of the host device 200 detects that the memory card 600 is inserted into the card slot, and reads the device information from the memory card 600 (step S111). In order to read the device information, for example, the registration device detecting unit 207 issues a read command for device information, and the controller 620 of the memory card 600 transmits the device information, which is stored in the ROM 623 or the like, to the host device 200 in response to the command.

When the host device is in the registration mode (step S112, YES), the device information read from the memory card 600 is stored in the registration device storing unit 206 of the host device 200, and the memory card 600 is registered in the host device 200 (step S113). Then, the host device 200 transitions to the normal mode (step S114). As described in the sixth embodiment, since the device information is used to prove that the memory card 600 is an authorized device, for example, the device information may be stored in a region inaccessible from the outside or may be encrypted except that the device information is registered in the host device 200.

In step S112, when the host device 200 is in the normal mode (step S112, NO), the comparator 208 of the host device 200 reads the registration information from the registration device storing unit 206 (step S115). Then, the comparator 208 compares the device information read from the memory card 600 with the registration information read from the registration device storing unit 206 (step S116).

As a result of the comparison, when two types of information do not match (step S117, NO), the host device 200 erases the data stored in the memory card 600. When a plurality of types of registration information are registered in the registration device storing unit 206, all or some types of registration information may be compared with the read registration information.

7.3 Advantage of Seventh Embodiment

As described above, the method described in the sixth embodiment may leadingly be executed by the host device 200. As described in the sixth embodiment, when the memory card 600 is not inserted into the card slot, the wireless communication system 630 or the wireless power supply system 640 of the memory card 600 may be used, and the accessible region of the host device 200 can be restricted for each memory card, instead of erasing the data.

8. Eighth Embodiment

A memory system according to an eighth embodiment will be described below. In the eighth embodiment, the removable card described in the fifth embodiment is detected by an X-ray or a magnetic field and then data are erased. In the following, differences from the fifth embodiment will be described.

8.1 Configuration of Memory Card

Figure 34:
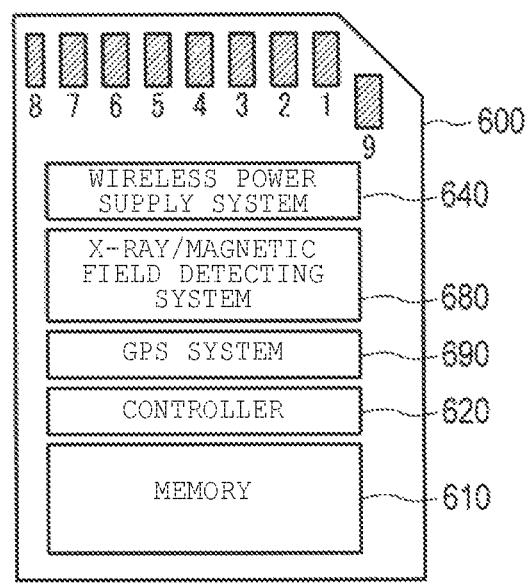
FIG. 34 is a block diagram of a host device according to an eighth embodiment.

FIG. 34 schematically illustrates a memory card according to the eighth embodiment. As illustrated in FIG. 34, a memory card 600 includes an X-ray/magnetic field detecting system 680 and a GPS system 690 in addition to the memory 610, the controller 620, and the wireless power supply system 640 described in the fifth embodiment.

The X-ray/magnetic field detecting system 680 detects an X-ray and/or a magnetic field, and sends a notification to the controller 620 when the X-ray and/or the magnetic field is detected.

The GPS system 690 obtains position information of the memory card 600 using radio waves and notifies the controller 620 of the position information.

Figure 35:
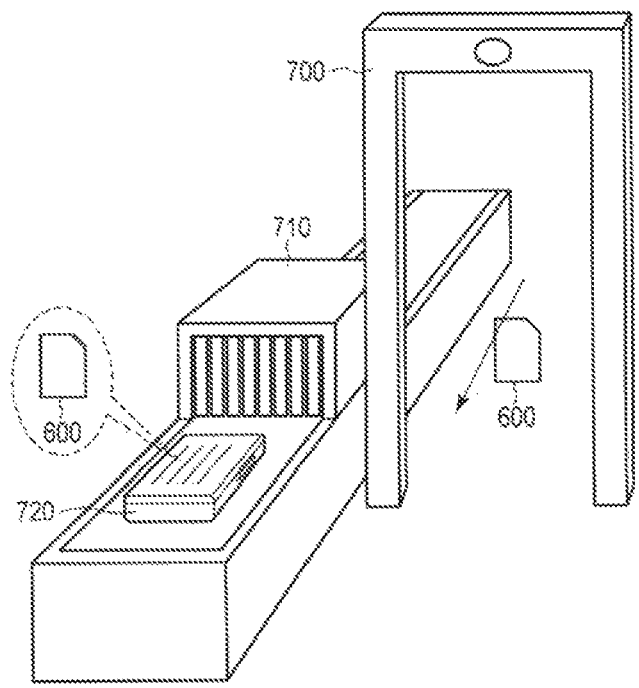
FIG. 35 is an overview of a security system according to the eighth embodiment.

FIG. 35 is an overview of a security system configured to detect the memory card 600 according to the eighth embodiment. As illustrated in FIG. 35, the security system includes a security gate 700 and an inspection device 710.

The security gate 700 has, for example, an arched shape, and detects using the X-ray or the magnetic field whether a person passing through the security gate 700 wears metal or the like. Therefore, when the person passes through the security gate 700 while having the memory card 600, the X-ray or the magnetic field is detected by the X-ray/magnetic field detecting system 680 included in the memory card 600.

The inspection device 710 inspects baggage using the X-ray or the magnetic field. For example, if the memory card 600 is contained in an attaché case 720, the X-ray or the magnetic field transmitted from the inspection device 710 is detected by the X-ray/magnetic field detecting system 680.

For example, the security system having the above configuration is provided at an entrance/exit of an area, for example, an office which is permitted to use the memory card 600.

8.2 Operation of Memory Card 600

Figure 36:
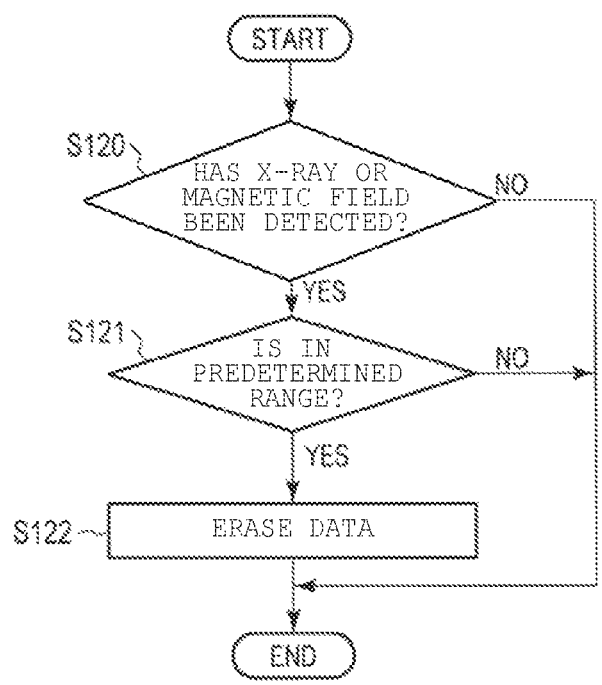
FIG. 36 is a flowchart illustrating an operation of a removable card according to the eighth embodiment.

An operation of the memory card 600 according to the eighth embodiment will be described below. FIG. 36 is a flowchart illustrating an operation when the memory card 600 passes through the security gate 700 or the inspection device 710 illustrated in FIG. 35.

As illustrated in FIG. 35, when the X-ray or the magnetic field is detected by the X-ray/magnetic field detecting system 680 (step S120, YES) and the position information of the GPS system 690 indicates that the memory card 600 is located in a predetermined area designated in advance (step S121), the controller 620 erases data stored in the memory 610 (step S122). At this time, the memory card 600 operates by receiving through the wireless power supply system 640 when not receiving the power supply from the host device.

8.3 Advantage of Eighth Embodiment

According to the eighth embodiment, as in the first and second examples of the third embodiment, it is possible to prevent the memory card from being taken out of the outside, and thus to effectively prevent information leak.

In addition, the security system using the X-ray or the magnetic field is used in various scenes of society. A typical example includes a security inspection zone such as airport. Then, even though the memory card is appropriately taken out of the office, the data stored in the memory card may be erased at such a security inspection zone.

In the eighth embodiment, with the GPS system 690 to be used as well, it is possible to erase data in a presumed range and protect data in other places even when the X-ray or the magnetic field is detected.

9. Ninth Embodiment

A memory system according to a ninth embodiment will be described below. The ninth embodiment is different from the fifth embodiment in that data are saved in a server before being erased. In the following, differences from the fifth embodiment will be described.

9.1 Configuration of Communication System

Figure 37:
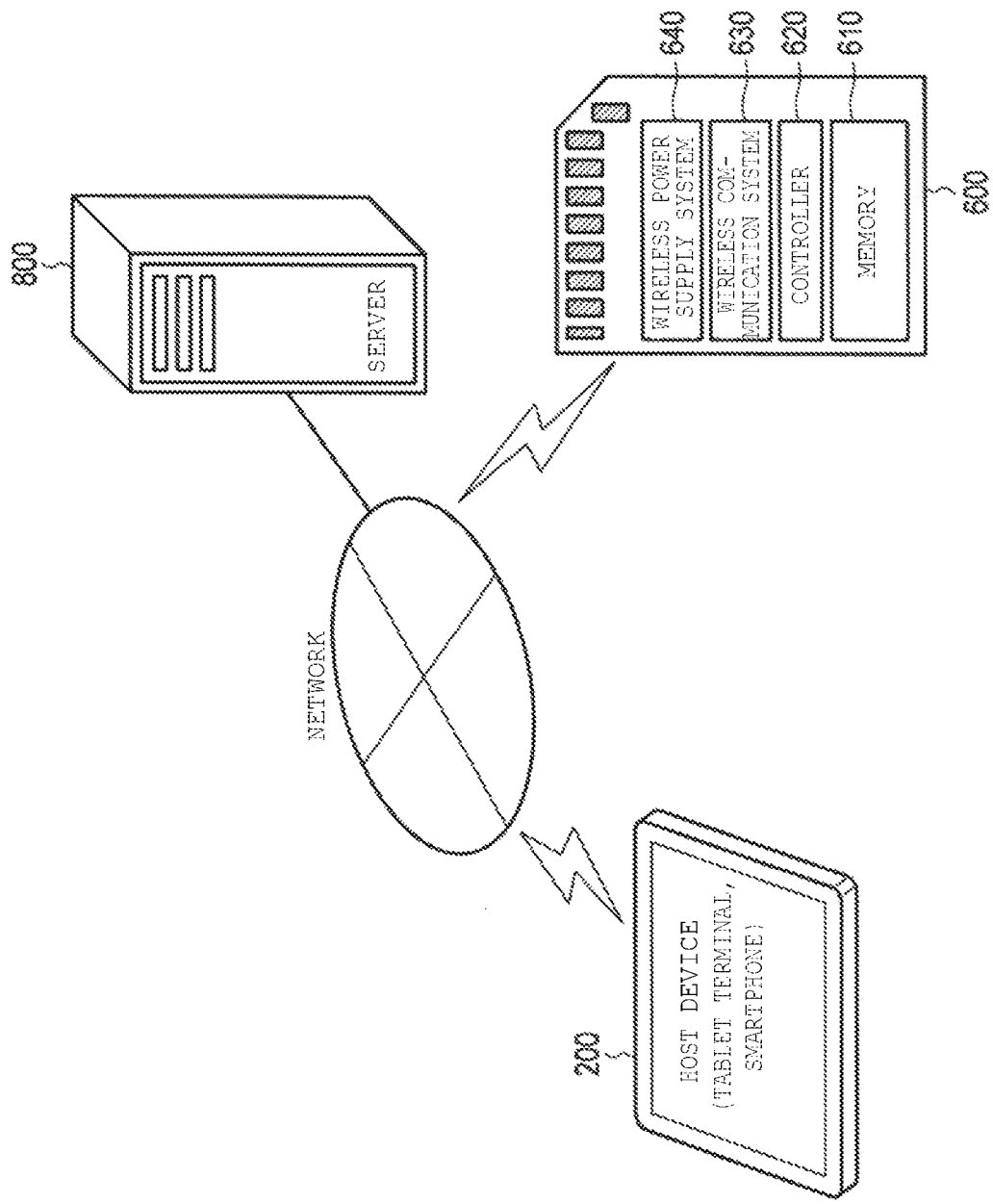
FIG. 37 schematically illustrates a communication system according to a ninth embodiment.

FIG. 37 schematically illustrates a communication system to which a memory card 600 according to the ninth embodiment is connected.

As illustrated in FIG. 37, a host device 200, a memory card 600, and a server 800 is communicable to each other via a network (Internet or Intranet) in the communication system according to the ninth embodiment. The host device 200 and the memory card 600 are connected to a network through, for example, a wireless LAN, and the server 800 is connected to the network through a wired LAN.

The host device 200 further includes a wireless communication system in addition to the configuration of the host device 200 illustrated in FIG. 32 according to the seventh embodiment, for example. However, the host device 200 may not include the registration device storing unit 206, the registration device detecting unit 207, and the comparator 208. In addition, the memory card 600 is configured as illustrated in FIG. 26 according to the fifth embodiment.

9.2 Operation of Communication System

Figure 38:
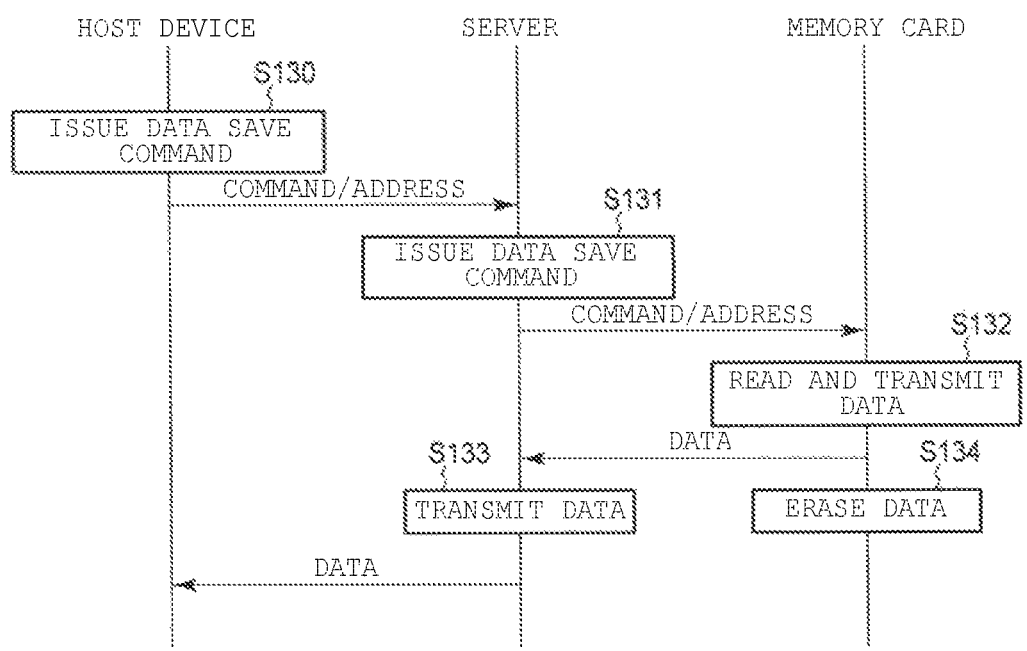
FIG. 38 is a flowchart illustrating an operation of the communication system according to the ninth embodiment.

FIG. 38 is a flowchart illustrating an operation of the communication system when the host device 200 issues the erase command in the fifth embodiment.

As illustrated in FIG. 38, the host device 200 issues a data save command subsequent to the erase command (step S130). This command is first transmitted to the server 800 and then transmitted to the memory card 600 from the server (step S131). At this time, an address designating the data to be saved may be transmitted at the same time as well as the data save command.

In the memory card 600 that has received the data save command, the controller 620 reads necessary data from the memory 610 and transmits the data to the server 800 through the wireless communication system 630 (step S132) before the data is erased (step S74) in FIG. 27. This data are further transmitted to the host device 200 from the server 800 (step S133). After the data are transmitted to the server 800, the controller 620 of the memory card 600 erases data stored in the memory 610 (step S134).

9.3 Advantage of Ninth Embodiment

According to the ninth embodiment, the memory card 600 saves the data to be erased in the server 800 before erasing the data stored in the memory 610. Accordingly, it is possible to protect the data from an unauthorized access while preventing important data from being lost.

In FIG. 38, it is assumed that the host device 200 issues the data save command. However, the memory card 600 may voluntarily perform the process of step S132 in response to the data erase command received from the host device 200 without waiting for the data save command from the host device 200.

10. Tenth Embodiment

A memory system according to a tenth embodiment will be described below. The tenth embodiment is different from the sixth embodiment in that data are saved in a server before being erased. In the following, differences from the fifth and sixth embodiments will be described.

10.1 Configuration of Communication System

Figure 39:
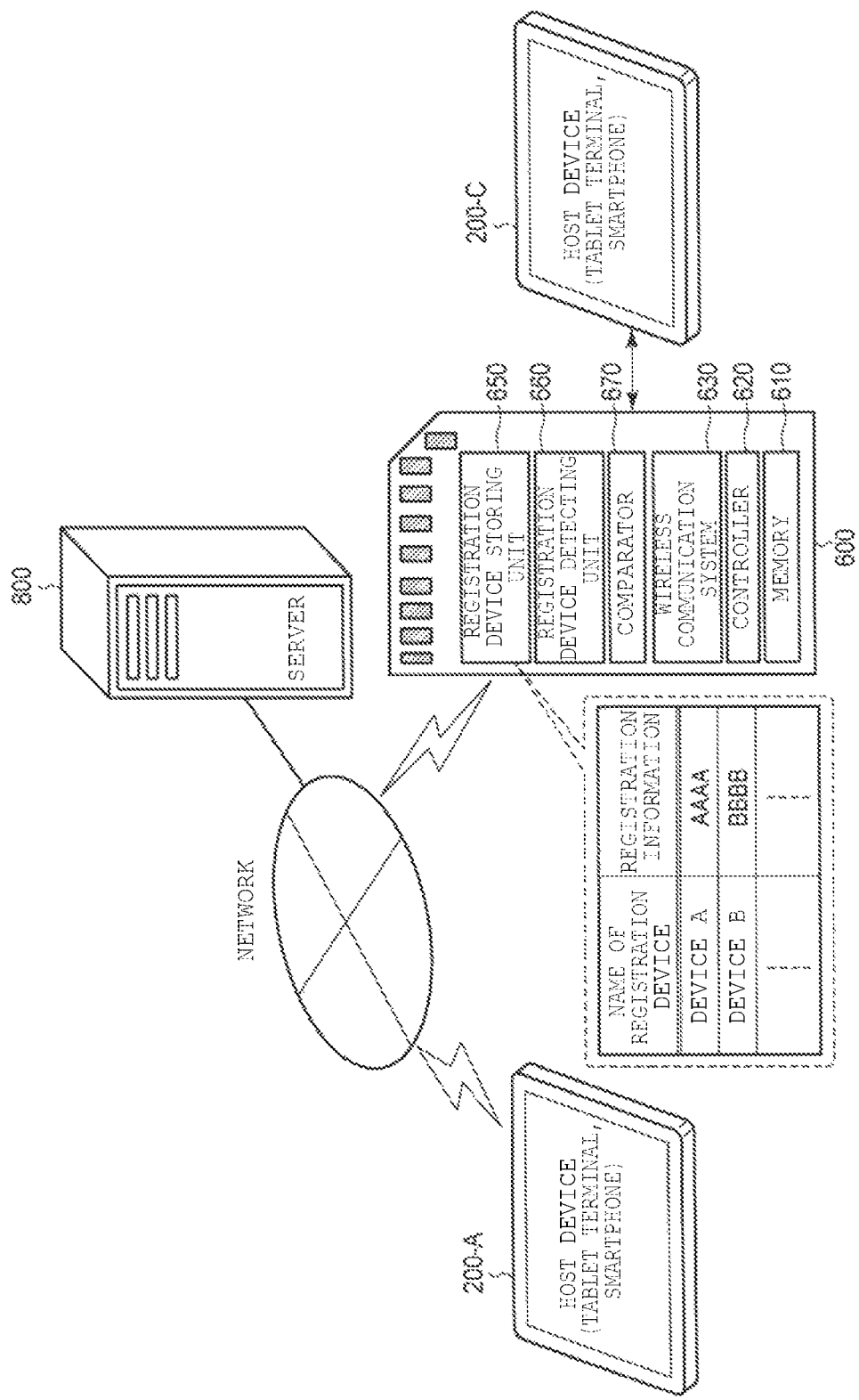
FIG. 39 schematically illustrates a communication system according to a tenth embodiment.

FIG. 39 schematically illustrates a communication system to which a memory card 600 according to the tenth embodiment is connected.

As illustrated in FIG. 39, the communication system according to the tenth embodiment has the same configuration as that illustrated in FIG. 37 according to the ninth embodiment. In addition, the memory card 600 further includes a wireless communication system 630 in addition to the configuration of FIG. 28 described in the sixth embodiment. The memory card 600 may further include a wireless power supply system 640.

10.2 Operation of Communication System

Figure 40:
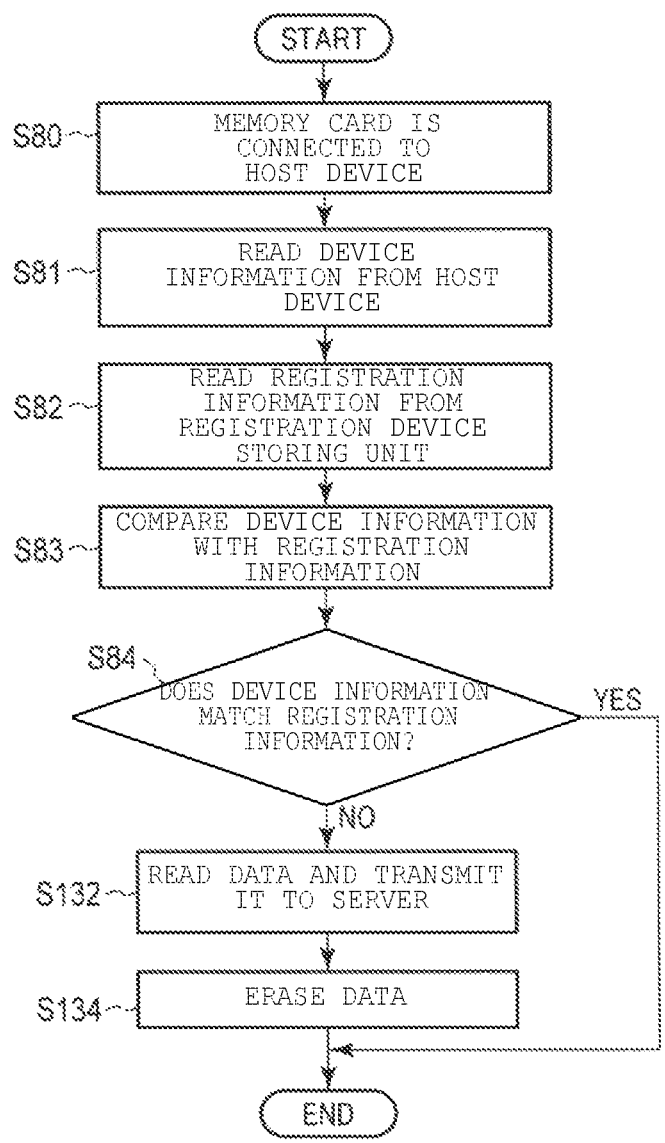
FIG. 40 is a flowchart illustrating an operation of a removable card according to the tenth embodiment.

FIG. 40 is a flowchart illustrating an operation of the memory card 600 when the memory card 600 is inserted into the card slot of the host device.

As illustrated in FIG. 40, subsequent to steps S80 to S84 illustrated in FIG. 29 in the sixth embodiment, when device information and registration information do not match (step S84, NO), a controller 620 reads data from a memory 610, and transmits the data to a server 800 (step S132). Thereafter, the controller 620 erases data stored in the memory 610 (step S134).

A specific example of the above operation will be briefly described with reference to FIG. 39. As illustrated in FIG. 39, host devices 200-A (device A) and 200-B (device B) are registered in a registration device storing unit 650 of the memory card 600. Accordingly, the host device 200-A can normally access the memory card 600.

In contrast, it is assumed that the memory card 600 is inserted into an unregistered host device 200-C. Then, since device information of the host device 200-C is not registered in the memory card 600, the controller 620 determines to be an unauthorized access, and erases the data stored in the memory 610. At this time, the memory card 600 operates by receiving power from the host device 200-C.

10.3 Advantage of Tenth Embodiment

As described above, even when there is an access from the unauthorized host device, data can be saved in the server before being erased.

11. Eleventh Embodiment

A memory system according to an eleventh embodiment will be described below. The eleventh embodiment is different from the fifth embodiment in that a controller notifies a host device of position information of a memory card instead of erasing data when the memory card is lost. In the following, differences from the fifth embodiment will be described.

11.1 Configuration of Memory Card

Figure 41:
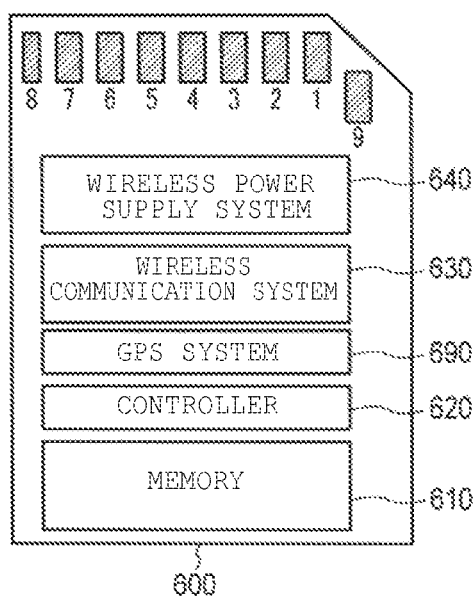
FIG. 41 is a block diagram of a removable card according to an eleventh embodiment.

FIG. 41 schematically illustrates a configuration of a memory card according to the eleventh embodiment. As illustrated in FIG. 41, a memory card 600 further includes the GPS system 690 described in the eighth embodiment with reference to FIG. 34 in addition to the configuration of FIG. 24 described in the fifth embodiment.

11.2 Operation of Memory Card

Figure 42:
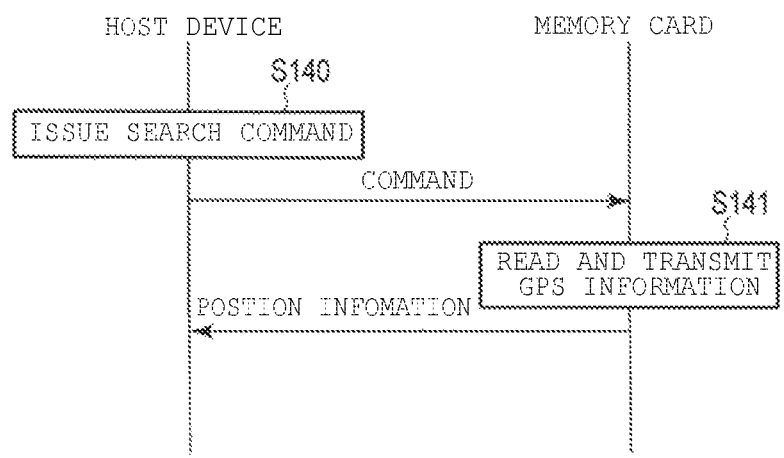
FIG. 42 is a flowchart illustrating an operation of a removable card and a host device according to the eleventh embodiment.

FIG. 42 is a flowchart illustrating an operation of the memory card 600 and a host device 200 according to the eleventh embodiment, and illustrates an operation when the memory card 600 is lost without being inserted into a card slot of the host device 200.

As illustrated in FIG. 42, the host device issues a search command in response to a user's command, and transmits the search command to the memory card 600 through wireless communication (step S140). In the memory card 600 that has received the search command, the controller 620 reads the position information from GPS system 690, and transmits the information to the host device through wireless communication (step S141).

11.2 Advantage of Eleventh Embodiment

According to the eleventh embodiment, even when the memory card 600 is lost, as long as the memory card 600 is in the area where the wireless communication is permitted and the wireless power supply is permitted, the user can know the location of the memory card 600.

Figure 43:
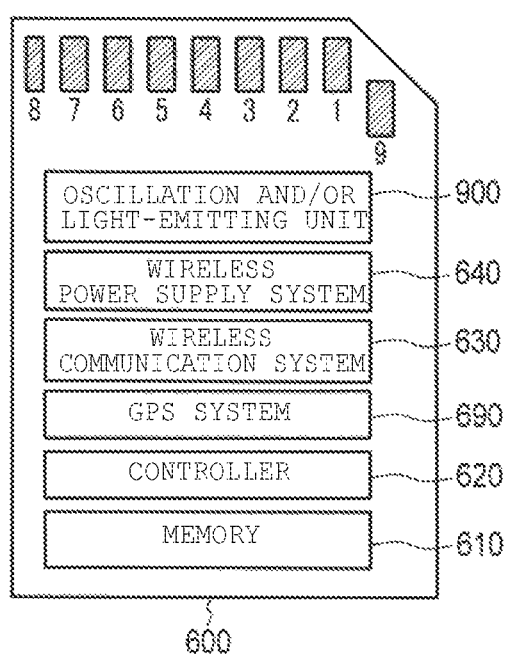
FIG. 43 is a block diagram of a removable card according to a modified example of the eleventh embodiment.

The memory card may include, for example, an oscillation and/or light-emitting unit 900 as illustrated in FIG. 43. The oscillation and/or light-emitting unit 900 oscillates or emits light when receiving a search command in response to a command of the controller 620. When the memory card 600 is located near the user, the user can know the location of the memory card 600 by the signal and/or light emission.

12. Modified Examples

As described above, the memory system (see FIG. 2) according to an embodiment includes the semiconductor memories 21 to 23 including the first memory region and the second memory region and the controller 20 or 10 that controls the semiconductor memories in response to the position information (information from the GPS 16) of the semiconductor memory. The controller 20 or 10 permits the access to the first memory region 21 and prohibits the access to the second memory region 22 when the position information indicates the first position (step S10, YES). Further, the controller 20 or 10 permits the access to the second memory region 22 and prohibits the access to the first memory region 21 when the position information indicates the second position different from the first position (step S12, YES).

In addition, the memory system (see FIG. 24) according to an embodiment includes the semiconductor memory 610, the controller 620 that controls the semiconductor memory, and the wireless communication unit 630 that can transmit and receive the signal through the wireless communication. When the wireless communication unit receives the first signal from the outside (step S73), the controller 620 erases at least a part of the data stored in the semiconductor memory 610.

According to the above configuration, it is possible to prevent unauthorized use of the data and improve reliability of the memory system. Various modified embodiments may be implemented without being limited to the above-described embodiments. For example, the POS terminal is described as an example in the first to third embodiments, but any other terminals may be used without being limited to the POS terminal. That is, when one information terminal is used for various purposes, as long as the terminal is requested to prevent contamination of information, the above-described embodiments are preferably implemented. In addition, the SD card is exemplified for the removable card in the fifth to eleventh embodiments, but any other mobile storage medium such as an USB memory may be used without being limited to the SD card or the semiconductor memory.

Furthermore, when data are erased in the first to eleventh embodiments, the data written in the memory cell of the NAND-type flash memory (memories 21 to 24 or 610) itself may be erased, but any other methods that can obtain the effect similar to the erasing may be used. For example, the FAT may be erased instead of the erasing of data. Although the data remains in the memory cell by the erasing of the FAT, it is extremely difficult to read the data from the outside in a normal access manner. However, the data can also be read using a special command.

In addition, a table may be erased which stores a relation between the logic address used when the host device accesses the controller and the physical address used when the controller accesses the NAND-type flash memory. This table is normally stored in the controller, but the erasing of the table can make it difficult to access necessary data.

Further, when data are encrypted, the encryption key may be erased or changed. For this reason, even though the data can be read from the NAND-type flash memory, it is difficult to restore plaintext from the read data, and thus the data are hard to illegally be used. In addition, a password is set for the data, data security can be improved by locking of the password, and thus the same advantage can also be obtained.

Furthermore, instead of erasing data, the memory cell itself may be physically destroyed. For example, the memory cell may not function as a storage element by causing a large current to flow into the memory cell using a fuse element. Alternatively, the data cannot be read or written by destruction of the row decoder or the transistor in the sense amplifier using the same manner. The controller may be physically destroyed by the same manner. In this case, the memory card almost no longer functions as a memory card.

In the ninth and tenth embodiments, it is assumed that the host device transmits the command to the removable card via the server. However, the host device may directly transmit the command to the removable card without using the server. In this case, the data may be saved in the server or the host device.

In addition, the data erasing or the access restriction may be performed for each host device or each memory space in each of the above embodiments. One example is the second example (see FIGS. 1 to 12) of the second embodiment or the sixth embodiment (see FIGS. 28 to 30). The data to be erased may be all or part of the data stored in the NAND-type flash memory, or may be predetermined for each host device or each memory space.

In addition, the first to eleventh embodiments may be performed in combination, or may be independently performed. Furthermore, each of the processes described in the flowchart may be replaced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A mobile storage device comprising:
first and second memory regions in one or more semiconductor memory devices, wherein the first memory region stores a first program for performing an ordering function and the second memory region stores a second program for performing an inventory management function;
a positioning system configured to generate positional information indicating a position of the mobile storage device; and
a controller configured to:
allow access to the first memory region and prohibit access to the second memory region and execute the first program when the positional information indicates that the position of the mobile storage device is within a public space in a restaurant, and prohibit access to the first memory region and allow access to the second memory region and execute the second program when the positional information indicates that the position of the memory storage device is within a private space in the restaurant.

2. The mobile storage device according to claim 1, wherein the first memory region is in a first semiconductor memory device, and the second memory region is in a second semiconductor memory device that is provided separately from the first semiconductor memory device.

3. The mobile storage device according to claim 2, wherein
the controller asserts a first control signal transmitted to the first memory device to allow access to the first memory region and deasserts the first control signal to prohibit access to the first memory region, and asserts a second control signal transmitted to the second memory device to allow access to the second memory region and deasserts the second control signal to prohibit access to the second memory region.

4. The mobile storage device according to claim 1, wherein
the first and second memory regions are in one semiconductor memory device and associated with first and second address ranges, respectively, and
the controller is configured to assert a signal to enable access to one of the first and second memory regions based on an address to be accessed.

5. The mobile storage device according to claim 1, wherein
the controller is configured to prohibit access to the first and second memory regions when the positional information indicates that the position of the mobile storage device is within neither the public space nor the private space.

6. The mobile storage device according to claim 1, wherein
the controller is configured to erase data stored in the first and second memory regions when the positional information indicates that the position of the mobile storage device is within a space, which is different from and does not overlap with the public space and the private space.

7. The mobile storage device according to claim 1, further comprising:
a display, wherein
the controller is configured to control the display to display information regarding access prohibition, when access to at least one of the first and second memory regions is prohibited.

8. The mobile storage device according to claim 1, wherein
the one or more memory devices and the controller are enclosed in a removable card that is detachably attached to the mobile storage device.

* * * * *